(12) United States Patent
Broman et al.

(10) Patent No.: US 7,383,501 B2
(45) Date of Patent: *Jun. 3, 2008

(54) AUTOMATED DOCUMENT FORMATTING TOOL

(75) Inventors: Paul Broman, Renton, WA (US); Glenn Frankel, Seattle, WA (US); Roberto C. Taboada, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/052,601

(22) Filed: Feb. 7, 2005

(65) Prior Publication Data

US 2005/0149871 A1 Jul. 7, 2005

Related U.S. Application Data

(63) Continuation of application No. 09/895,914, filed on Jun. 29, 2001.

(51) Int. Cl.
*G06F 17/00* (2006.01)
*G06F 17/20* (2006.01)
*G06F 3/048* (2006.01)

(52) U.S. Cl. ............... 715/255; 715/200; 715/256; 715/273; 715/769; 715/770

(58) Field of Classification Search ........... 715/531, 715/530
See application file for complete search history.

(56) References Cited

U.S. PATENT DOCUMENTS 4,878,167 A  10/1989  Kapulka et al. ............ 364/200

(Continued)

OTHER PUBLICATIONS

Chen, Pehong, et al., "Incremental Document Formatting", ACM Conference on Document Processing Systems, Santa Fe, NM, Dec. 5-9, 1988, pp. 93-100 [ACM 0-89791-291-8/88/0012/0093].*

(Continued)

*Primary Examiner*—Cam-Y Truong
*Assistant Examiner*—Robert Stevens
(74) *Attorney, Agent, or Firm*—Merchant & Gould

(57) ABSTRACT

A formatting tool enables "smart" copy and paste functions. The "smart" copy and paste functions can be invoked in a context-sensitive manner, depending on the conditions under which the copy and paste functions are implemented. The present invention will automatically include in a selection a paragraph marker at the end of a selected paragraph, if every other textual character in the paragraph has been selected. The present invention will discard a paragraph mark that is included in pasted text if the pasted text is pasted into the middle of another paragraph, indicating that the user prefers the formatting of the pasted-into paragraph. The present invention also reduces inconsistencies in formatting styles that may exist between source and target documents automatically redefining a style in the target document to conform to a corresponding style in the source document. The present invention also automatically adjusts paragraph spacing, in response to text being pasted into a target document. In response to various scenarios, the present invention will determine the most likely paragraph spacing intended by the user and will apply the most probable paragraph spacing to the pasted paragraph. The present invention also automatically adjusts list, table, and spreadsheet formatting, in response to such document elements being pasted into a differently-formatted target document. Finally, the present invention provides a convenient recovery dialog that may be invoked to alter any automatically-implemented formatting decisions.

19 Claims, 12 Drawing Sheets

U.S. PATENT DOCUMENTS

| | | | |
|---|---|---|---|
| 5,033,008 A * | 7/1991 | Barker et al. | 715/523 |
| 5,129,052 A * | 7/1992 | Barker et al. | 715/514 |
| 5,185,698 A * | 2/1993 | Hesse et al. | 715/531 |
| 5,442,742 A * | 8/1995 | Greyson et al. | 715/539 |
| 5,530,794 A * | 6/1996 | Luebbert | 715/524 |
| 5,537,628 A * | 7/1996 | Luebbert | 715/522 |
| 5,598,518 A | 1/1997 | Saito | 715/531 |
| 5,608,625 A | 3/1997 | Bailey | 715/540 |
| 5,621,875 A * | 4/1997 | Mason et al. | 715/531 |
| 5,659,791 A | 8/1997 | Nakajima et al. | 715/539 |
| 5,694,610 A | 12/1997 | Habib et al. | 715/531 |
| 5,778,402 A * | 7/1998 | Gipson | 715/530 |
| 5,835,919 A | 11/1998 | Stern et al. | 715/515 |
| 5,860,073 A | 1/1999 | Ferrel et al. | 715/522 |
| 5,867,144 A | 2/1999 | Wyard | 345/769 |
| 5,890,177 A * | 3/1999 | Moody et al. | 715/511 |
| 5,897,650 A | 4/1999 | Nakajima et al. | 715/539 |
| 5,900,004 A * | 5/1999 | Gipson | 715/530 |
| 5,963,205 A * | 10/1999 | Sotomayor | 715/531 |
| 6,016,492 A * | 1/2000 | Saxton et al. | 707/100 |
| 6,081,818 A * | 6/2000 | Shieh | 715/539 |
| 6,088,711 A * | 7/2000 | Fein et al. | 715/523 |
| 6,105,044 A * | 8/2000 | DeRose et al. | 715/514 |
| 6,108,668 A | 8/2000 | Bates et al. | 707/203 |
| 6,112,214 A | 8/2000 | Graham et al. | 715/503 |
| 6,112,216 A | 8/2000 | Pratley et al. | 715/509 |
| 6,128,633 A * | 10/2000 | Michelman et al. | 715/525 |
| 6,133,915 A | 10/2000 | Arcuri et al. | 715/779 |
| 6,185,591 B1 | 2/2001 | Baker et al. | 715/531 |
| 6,202,060 B1 | 3/2001 | Tran | 707/3 |
| 6,223,191 B1 | 4/2001 | Truelson | 715/517 |
| 6,240,430 B1 | 5/2001 | Deike et al. | 715/539 |
| 6,480,206 B2 * | 11/2002 | Prinzing | 715/762 |
| 6,510,441 B1 * | 1/2003 | Kenninga | 715/521 |
| 6,605,122 B1 | 8/2003 | Hearn et al. | 715/530 |
| 6,697,999 B1 | 2/2004 | Breuer et al. | 715/517 |
| 2001/0018697 A1 | 8/2001 | Kunitake et al. | 707/517 |
| 2001/0032214 A1 | 10/2001 | Bauchot et al. | 707/503 |
| 2002/0010717 A1* | 1/2002 | Breuer et al. | 707/517 |
| 2002/0049785 A1 | 4/2002 | Bauchot | 707/503 |
| 2002/0064308 A1* | 5/2002 | Altman et al. | 382/187 |
| 2002/0129171 A1 | 9/2002 | Coiner | 709/310 |
| 2002/0188637 A1 | 12/2002 | Bailey et al. | 707/530 |
| 2006/0117271 A1 | 6/2006 | Keim | 715/789 |

OTHER PUBLICATIONS

Gutknecht, J., "Concepts of the Text Editor Lara", Communications of the ACM, vol. 28 No. 9, Sep. 1985, pp. 942-960 [ACM 0001-0782/85/0900-0942].*

Rubin, Charles, Running Microsoft Word 2000, Microsoft Press, Redmond, WA, © 1999, pp. 60-72, 94-105, 273-287 and 380-385.*

Bott, Ed, et al., Special Edition, Using Microsoft Office XP, Que Publishing, Inc., Indianapolis, IN, May 2001, pp. 466-473.*

*Training agents to recognize text by example*; Henry Lieberman, Bonnie A. Nardi and David Wright; *Proceedings of the third annual conference on Autonomous Agents*, (1999) p. 116-122.

*Text formatting by demonstration*; Brad A. Myers; *Human factors in computing systems conference proceedings on reaching through technology*, (1991) p. 251-256.

*Artificial intelligence processing*, Geoffrey James; *Proceedings of the fifth international conference on systems documentation*, (1987) p. 8-12.

*An adaptive environment for the user interface of Excel*; Christopher G. Thomas and Mette Krogsaeter; *Proceedings of the international workshop on intelligent user interfaces*, (1993) p. 123-130.

*Automatic text structuring and retrieval-experiments in automatic encyclopedia searching*; Gerard Salton and Chris Buckley: *Proceedings of the fourteenth annual international ACM/SIGIR Conference on research and development in information retrieval*, (1991) p. 21-30.

*Higher-order attribute grammars and editing environments*; Tim Teitelbaum and Richard Chapman; *Proceedings of the conference on programming language design and implementation*, (1990) p. 197-208.

Rubin, Charles, Running Microsoft Word 2000, Microsoft Press, Redmond, WA © 1999, pp. 60-72, 94-105, 273-287 and 380-385.

"Chapter 4: Microsoft Word", downloaded from: www.abu.nb.ca/PDF/Chaper4.pdf, Fall 2000, pp. 4-1 through 4-5.

Kissell, Joe, The Nisus Way, "Chapter 10. Advanced Editing", Microsoft Press, downloaded from: www.alt.cc/tnw/10.html, © 1999, pp. 1-36.

"Microsoft Word for Windows (Word Processing Program Version 2.0) User's Guide", Microsoft Corporation, Redmond, WA, © 1991, document No. OB-32756-0492, pp. 24, 94-95, 100-112, 159-160, 265 and 525-526.

Use Your PC to Master Japanese and Chinese, "Lesson 4: Intermediate Document Editing", Microsoft Press, downloaded from: www.aproposinc.com/ScfwUG/22c_17.htm, Mar. 23, 1996, pp. 1-8.

Microsoft Word (version 6.0) User's Guide, published by Microsoft Corporation, Document No. WB57923-0394, (c) 1994, pp. 36-45, 60-61, 65, 125-128, 150-152, 154, 167-170, 180-181, 189-191, 283-290, and 302.

Greg Harvey et al., Microsoft Office 2000: 9 in 1 for Dummies, published by Wiley Publishing, ISBN: 0-7645-0333-2, (c) 1999, pp. 245-254.

U.S. Appl. No. 11/050,173, entitled "Automated Document Formatting Tool," filed Feb. 3, 2005, Inventors: Paul Broman; Glenn Frankel; and Roberto C. Taboada.

U.S. Appl. No. 11/052,441, entitled "Automated Document Formatting Tool," filed Feb. 7, 2005, Inventors: Paul Broman; Glenn Frankel; and Roberto C. Taboada.

U.S. Office Action dated Oct. 30, 2007 cited in U.S. Appl. No. 11/050,173.

"Microsoft Word (version 6.0) User's Guide" published by Microsoft Corporation, 1994, pp. 36-45, 60-61- 65, 125-128, 150-152, 154, 167-170, 180-181, 189-191, 283-290, 302.

* cited by examiner

AUTOMATED DOCUMENT FORMATTING TOOL

CROSS REFERENCE TO RELATED APPLICATION

This application is a continuation of application Ser. No. 09/895,914 filed Jun. 29, 2001.

FIELD OF THE INVENTION

The present invention generally relates to editing electronic documents. More particularly, the present invention relates to automatically formatting text that is copied, cut, or pasted.

BACKGROUND OF THE INVENTION

Copying and pasting text is the most widely-used means of introducing content to a word processor document. The popularity of the copy and paste functions stems in large part from the fact that a user can use the functions to quickly import material from a variety of sources. Word processor users commonly copy and paste material from source documents, such as word processor documents, e-mail notes, spreadsheets documents, and web pages. Unfortunately, pasting material into a target document often results in unpredictable formatting behavior. The text that is pasted into the target document is often in a format that is either inconsistent with the rest of the document or inconsistent with the user's expectations. This problem is often made worse by the fact that the format of the text in the source document may be different than the formatting of text in the target document. Conventional pasting functions also fail to provide recovery mechanisms. Consequently, when a user pastes text into a word processor document, the user must take affirmative steps to format the pasted text to the user's liking.

One approach to solving this problem has been to provide a "Paste Special" function that permits the user to select from various formats at the time of pasting the text into the target document. Unfortunately, the user must be aware of the availability of the "Paste Special" functionality and must make an affirmative step to implement this function. Studies of the results provided by instrumented versions of word processor application programs indicate that the "Paste Special" functionality is not commonly used.

Therefore, there is a need in the art for a formatting tool that can automatically determine the most likely formatting choices based on the context and on the user's behavior. The formatting tool also should enable the user to quickly select the formatting of the pasted text. The formatting tool should operate within the confines of a document editor's normal operation, in that it does not require the user to take alternative steps to invoke the automatic formatting. The formatting tool also should provide a recovery mechanism that enables the user to quickly re-format text that has been automatically formatted, when the automatic formatting is not the desired formatting.

SUMMARY OF THE INVENTION

The present invention satisfies the above-described needs by providing a formatting tool that enables "smart" copy and paste functions. The "smart" copy and paste functions can be invoked in a context-sensitive manner, depending on the conditions under which the copy and paste functions are implemented.

When a user selects a paragraph or a portion of a paragraph to copy, the user may or may not select the paragraph marker at the end of the paragraph. When a user pastes text having a paragraph marker at the end, the formatting of that pasted text may be different than if the user had pasted text without the paragraph marker at the end. Usability studies indicate that users commonly inadvertently include or exclude a paragraph mark from selected text. As a result, a user will commonly be surprised by the formatting behavior upon pasting such selected text. The present invention will automatically include in a selection a paragraph marker at the end of a selected paragraph, if every other textual character in the paragraph has been selected. This behavior is based on the assumption that the user intends to select the entire paragraph, as a paragraph, rather than as unformatted text. The user may override this behavior by moving the selection cursor to the left of the paragraph marker before finalizing the text selection. In addition, the present invention will discard a paragraph mark that is included in pasted text if the pasted text is pasted into the middle of another paragraph, indicating that the user prefers the formatting of the pasted-into paragraph. Thus, the present invention assists a user in selecting and pasting text where a paragraph marker may alter the formatting of the pasted text.

The present invention also reduces inconsistencies in formatting styles that may exist between source and target documents. When a user pastes styled text from a source document the style of the pasted text may be inconsistent with a corresponding style in the target document having the same style name. In cases where the corresponding style has not been used or explicitly redefined in the target document, pasting styled text from a source document will redefine the corresponding style in the target document. This functionality can also be applied to all other styles. However, in one embodiment of the present invention, if any style of a group of styles is presently in use in the target document, then none of the other styles in that group will be redefined when the text is pasted into the target document.

The present invention also automatically adjusts paragraph spacing, in response to text being pasted into a target document. Pasting text into a target document often results in unwanted empty paragraphs or inconsistent paragraph spacing. In response to various scenarios, the present invention will determine the most likely paragraph spacing intended by the user and will apply the most probable paragraph spacing to the pasted paragraph.

The present invention also automatically adjusts list formatting, in response to text in a list being pasted into a differently-formatted list in a target document. Pasting list text into an existing list in a target document often results in inconsistent list formatting. In response to various scenarios, the present invention will determine the most likely list format intended by the user and will apply the most probable list format to the pasted list text.

The present invention also automatically adjusts table cell formatting, in response to text from a table being pasted into a differently-formatted table or into a non-table paragraph in a target document. Pasting table text into an existing table in a target document often results in inconsistent table formatting or in an unwanted nested table. Similarly, pasting table text into a non-table paragraph can result in the creation of a new unwanted table in the target document. In response to various scenarios, the present invention will determine the most likely table formatting (or non-table formatting) intended by the user and will apply the most probable formatting to the pasted text.

The present invention also automatically determines whether a user pasting a table from a spreadsheet intends to paste an image of the spreadsheet, an object of the spreadsheet application program, or a link to the spreadsheet document file.

The present invention also automatically resolves style conflicts between the source document and the target document to determine the most-likely formatting intentions of the user. The present invention will apply a style to pasted text in accordance with this formatting determination.

Finally, the present invention will provide a convenient recovery dialog that may be invoked to alter any automatically implemented formatting decisions. Thus, if the present invention makes an incorrect determination regarding the user's formatting intentions, the formatting may be easily altered. The user may also turn the automatic formatting tools off in a preferences dialog box.

The various aspects of the present invention may be more clearly understood and appreciated from a review of the following detailed description of the disclosed embodiments and by reference to the drawings and claims.

DETAILED DESCRIPTION

In one embodiment of the present invention, a formatting tool is provided that enables "smart" copy and paste functions. The "smart" copy and paste functions can be invoked in a context sensitive manner, depending on the conditions under which the copy and paste functions are implemented. The present invention will automatically include in a selection a paragraph marker at the end of a selected paragraph, if every other textual character in the paragraph has been selected. The present invention will discard a paragraph mark that is included in pasted text if the pasted text is pasted into the middle of another paragraph, indicating that the user prefers the formatting of the pasted-into paragraph.

An embodiment of the present invention reduces inconsistencies in formatting styles that may exist between source and target documents automatically redefining a style in the target document to conform to a corresponding style in the source document. The present invention also automatically adjusts paragraph spacing, in response to text being pasted into a target document. In response to various scenarios, the present invention will determine the most likely paragraph spacing intended by the user and will apply the most probable paragraph spacing to the pasted paragraph. The present invention also automatically adjusts list, table, and spreadsheet formatting, in response to such document elements being pasted into a differently-formatted target document. Finally, exemplary embodiments of the present invention provide a convenient recovery dialog that may be invoked to alter any automatically-implemented formatting decisions.

An Exemplary Operating Environment

Figure 1:
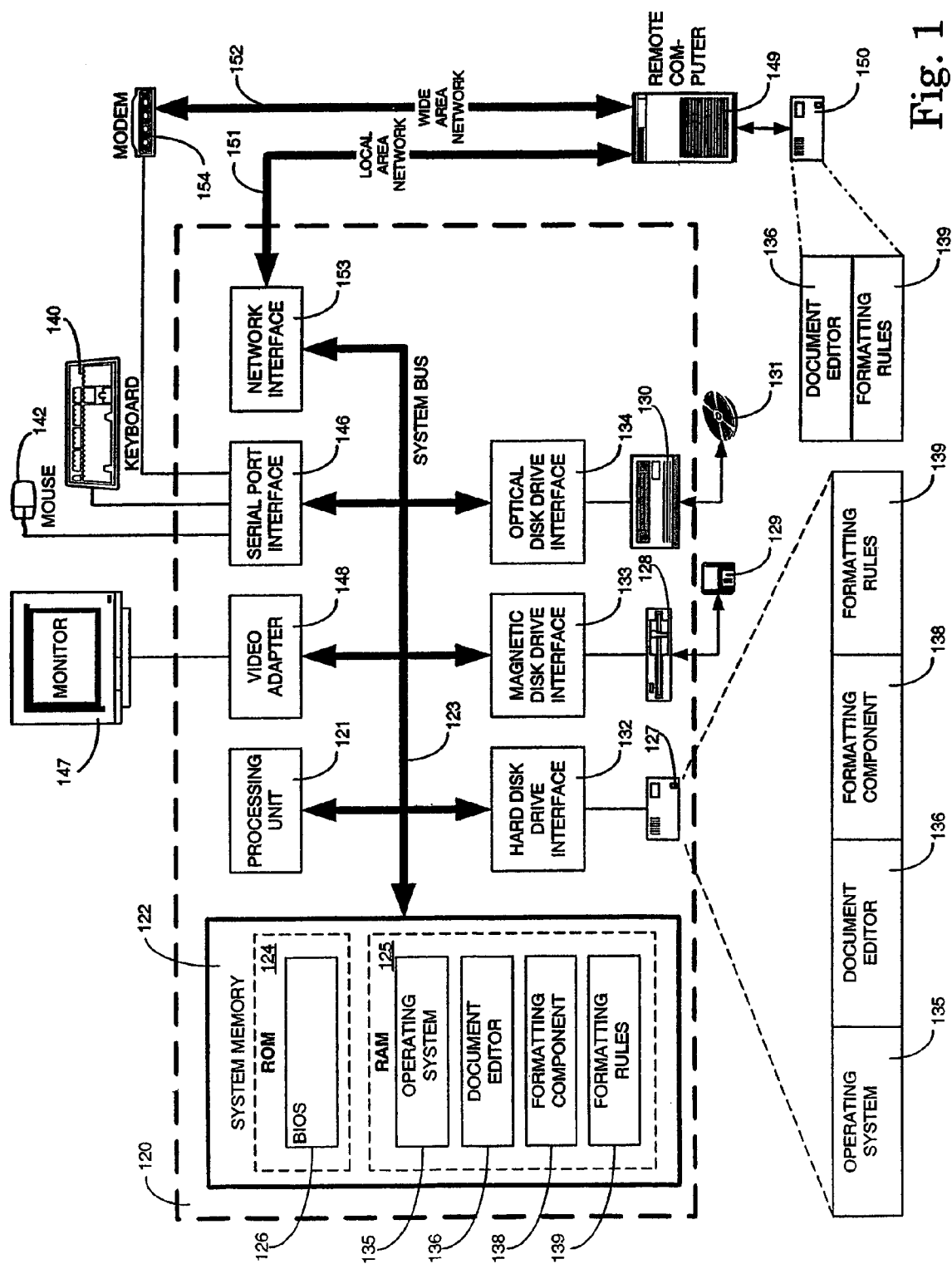
FIG. 1 is a block diagram illustrating an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a document editor 136, a formatting component 138, and a formatting rules component 139. Program modules include routines, sub-routines, programs, objects, components, data structures, etc., which perform particular tasks or implement particular abstract data types. Aspects of the present invention may be implemented in the form of a formatting component 138 that can be incorporated into or otherwise in communication with the document editor 136. The document editor 136 generally comprises computer-executable instructions for creating or modifying an electronic document. The formatting component 138 generally comprises computer-executable instructions for applying and modifying formatting to text and/or other document elements. The formatting component 138 is generally accessible to the document editor 136, but can also be implemented as an integral part of the document editor.

A user may enter commands and information into personal computer 120 through input devices, such as a keyboard 140 and a pointing device 142. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the figure. The logical connections depicted in the figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
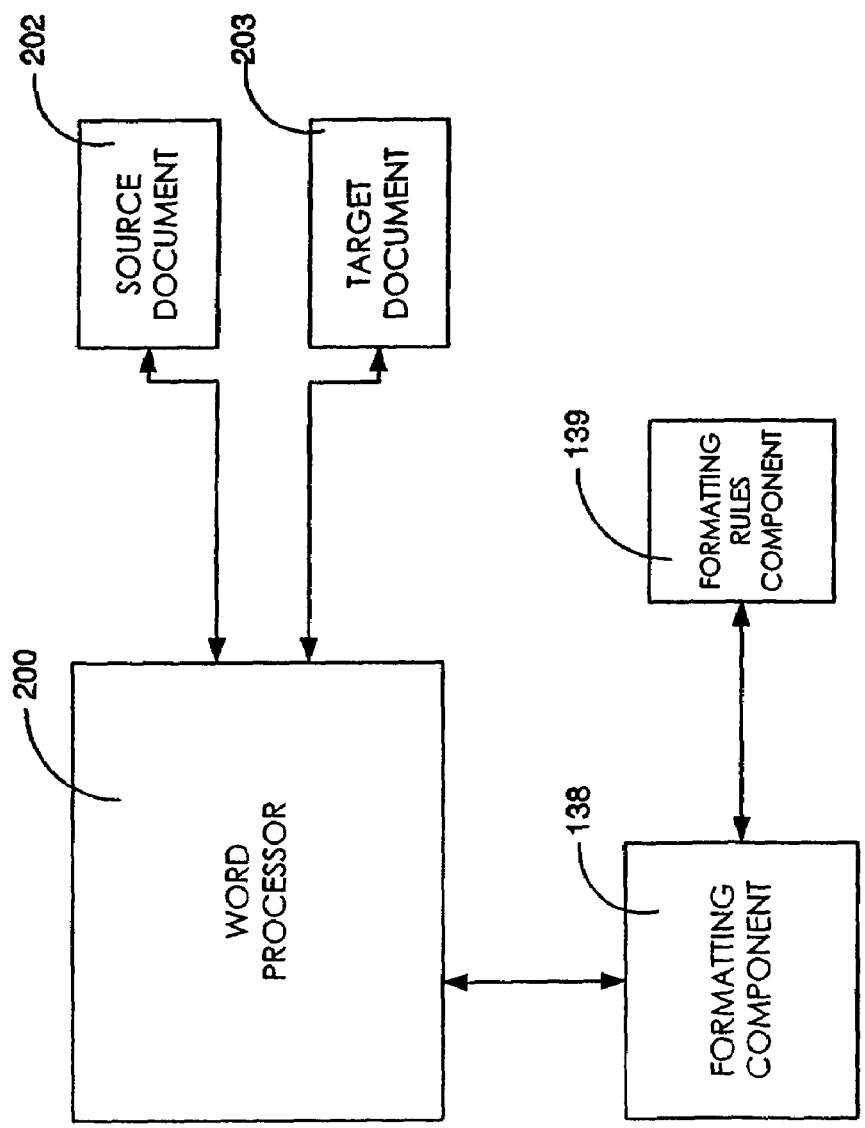
FIG. 2 is a block diagram depicting an exemplary formatting component operating within the context of a word processor.

FIG. 2 is a block diagram depicting an exemplary formatting component 138 operating within the context of a word processor 200. In this exemplary embodiment of the present invention word processor 200 is a document editor that can be used to create and manipulate a source document 202 and a target document 203. The formatting component 138 works in cooperation with the word processor 200 to provide formatting and editing tools for the source document 202 and for the target document 203. The formatting component 138 can maintain information about the documents 202, 203 including, but not limited to, information about text formatting, table formatting, chart formatting, and list formatting. The formatting component 138 also can control the way that document elements (e.g., text) are cut, copied, and pasted within and between the source document 202 and the target document 203.

Individualized application of formatting properties to text is referred to as direct formatting. Text may be formatted identically through direct formatting and the application of a style. However, style application is a quicker and easier method of applying formatting properties to the text in a portion of a document. Moreover, styles are used to verify formatting consistency among portions of a document that have the same style applied to them. Changes to the collection of formatting properties in a style will simultaneously change the format of all text to which that styles is applied. The formatting component 138 of an exemplary embodiment of the present invention maintains a record of the formatting properties associated with each portion of the document 202.

The formatting component 138 of an exemplary embodiment of the present invention can automatically re-format a document element that is cut, copied or pasted between documents or between portions of the same document. The formatting component 138 can re-format a document element, based on the properties of the document element, the behavior of a user, the context from which the document element was cut or copied, and/or context into which the document element is pasted.

One means by which the formatting component 138 can automatically trigger re-formatting is through the use of rules maintained in a formatting rules component 139. The formatting rules component can maintain a list of rules that describe events that can trigger an automatic re-formatting. For example, one rule might recognize the occurrence of an event wherein the user attempts to copy and past a single cell of a table. The formatting rules component 139 may also have a list of responsive actions associated with the list of rules. When a rule is triggered, the formatting rules component 139 may instruct the formatting component 138 to execute the associated responsive action. Notably, those skilled in the art will appreciate that not all of the formatting rules need be implemented simultaneously.

The formatting component 138 of an exemplary embodiment of the present invention also can provide an On-Object User Interface (OOUI) to enable a user to recover from or reconfigure an automatic reformatting. The OOUI may be automatically displayed within the context of a document editor (e.g., spreadsheet program, word processor, presentation, web page editor), in response to an automatic re-formatting action taken by the formatting component 138. The OOUI can be selected by a user to provide a drop-down menu of available recovery options. Thus, the user is not required to accept the automatic reformatting action taken by the formatting component 138. A more detailed description of the OOUI can be found in U.S. Pat. No. 6,583,798 assigned to Microsoft Corporation of Redmond, Wash. That patent application is entitled "ON-OBJECT USER INTERFACE" and is hereby incorporated by reference in its entirety.

Although the descriptions of the inventions provided in connection with FIGS. 4-12 often describe the formatting, copying, and pasting of text, it will be appreciated by those skilled in the art that the present invention can be used to automatically format any document element. Document elements can include, but are not limited to, text, spreadsheets, tables, list, and charts.

It will also be appreciated that the OOUI or other recovery user interface can be displayed following an automatic formatting action to allow a user to reverse the formatting action. In addition, the recovery user interface can be displayed following a user's selection of a recovery action and the performance of that recovery action. Accordingly, the user can sequentially select various recovery actions from a recovery user interface to determine the effects of each, before deciding on a preferred recovery action. Although the descriptions provided in connection with FIGS. 4-12 may not describe the provision of a recovery user interface following an automatic action or a recovery action, those skilled in the art will appreciate that such a recovery user interface could be provided within the scope of the embodiments of the present invention.

Figure 3:
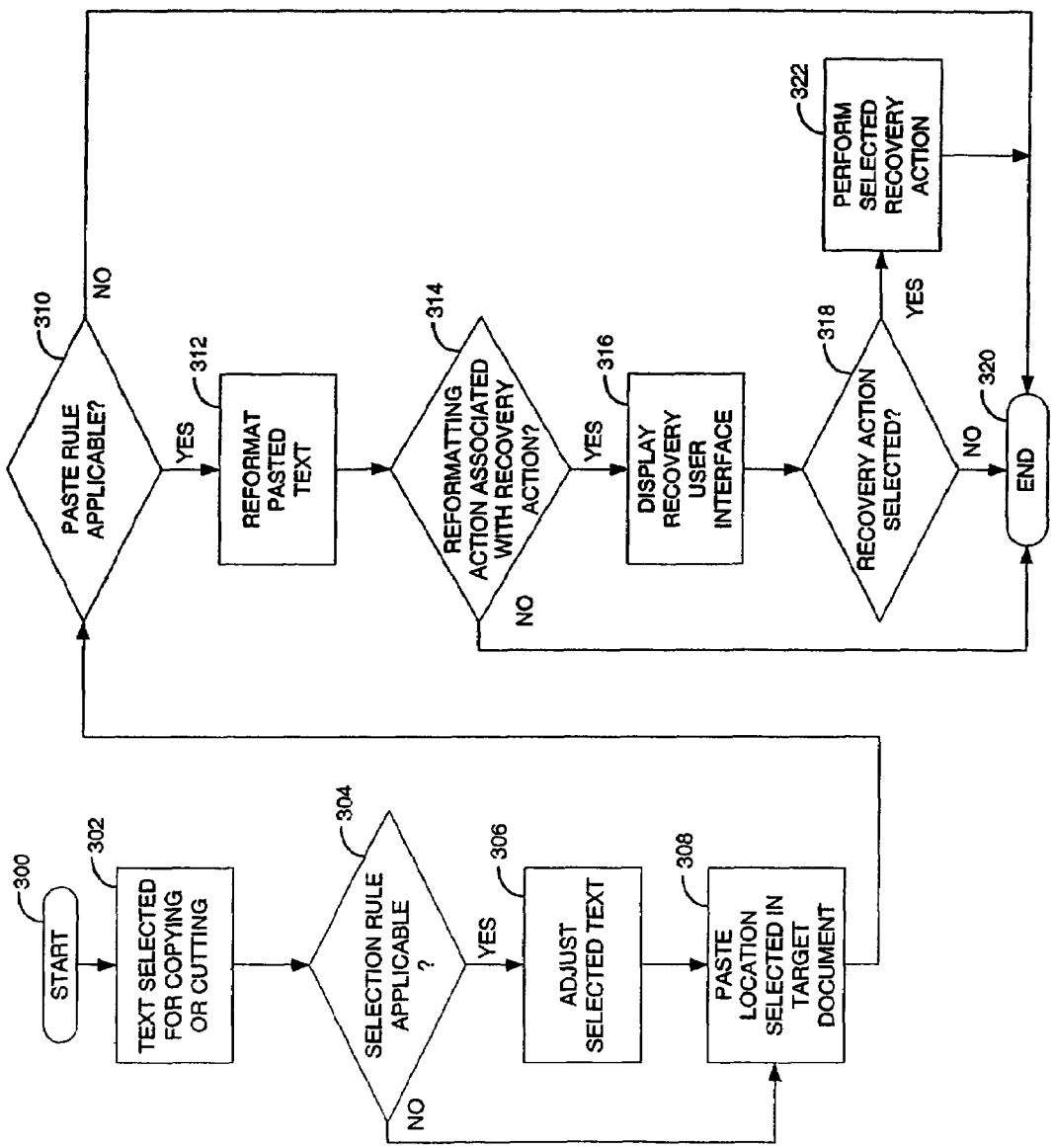
FIG. 3 is a flow chart depicting an exemplary method for automatically re-formatting a document element, in response to the triggering of a formatting rule.

FIG. 3 is a flow chart depicting an exemplary method for automatically re-formatting a document element, in response to the triggering of a formatting rule. The method begins at step 300 and proceeds to step 302. At step 302, text is selected for copying or cutting. Typically, this is performed by a user who selects text using a pointing device (e.g., a mouse) that controls a selection cursor and then selecting to copy or cut the selected text from the source document. The method proceeds from step 302 to decision block 304. At decision block 304, a determination is made as to whether a selection formatting rule is applicable. If a selection formatting rule is applicable, the method proceeds to step 306 and the selected text is adjusted according to the formatting rule. The method then proceeds to step 308 and the paste point is selected in the target document. If, on the other hand, a determination is made at decision block 304 that no selection rule is applicable, the method will branch directly from decision block 304 to step 308.

The method proceeds from step 308 to decision block 310. At decision block 310, a determination is made as to whether a paste formatting rule is applicable. If a paste formatting rule is applicable, the method branches to step 312 and the pasted text is reformatted, in accordance with a paste formatting rule. The method then proceeds to decision block 314, wherein a determination is made as to whether the re-formatting action is associated with a recovery action. If a determination is made that the re-formatting action is not associated with a recovery action, the method branches to step 320 and ends.

If, on the other hand, the re-formatting is associated with a recovery action, the method branches to step 316 and the recovery user interface is displayed (e.g., OOUI). The method then proceeds to decision block 318, wherein a determination is made as to whether a recovery action is selected. If a recovery action is not selected, the method branches to step 320 and ends. If a recovery action is selected, the method branches to step 322 and the selected recovery action is performed, the method proceeds from step 322 to step 320 and ends. Although not depicted in FIG. 3, the recovery user interface also may continue to be displayed after the selected recovery action is performed (i.e., after step 322), so that the first selected recovery action can be undone.

It will be appreciated by those skilled in the art that various methods for triggering re-formatting actions and for providing access to recovery actions may be used within the scope of the present invention. FIGS. 4-12 are flow charts that define exemplary methods for re-formatting document elements and for providing recovery options, following such a re-formatting. The flow charts of FIGS. 4-12 do not necessarily describe the triggering of a formatting rule. However, it will appreciated by those skilled in the art that the methods described in FIGS. 4-12 could be implemented with a collection of rules and associated response of actions or by various other well-known means. For the purposes of this description, a document from which text is cut or copied, is referred to as the source document. The document to which selected text is pasted is referred to as the target document. Those skilled in the art will appreciate that the source document and the target document may be the same document.

Figure 4:
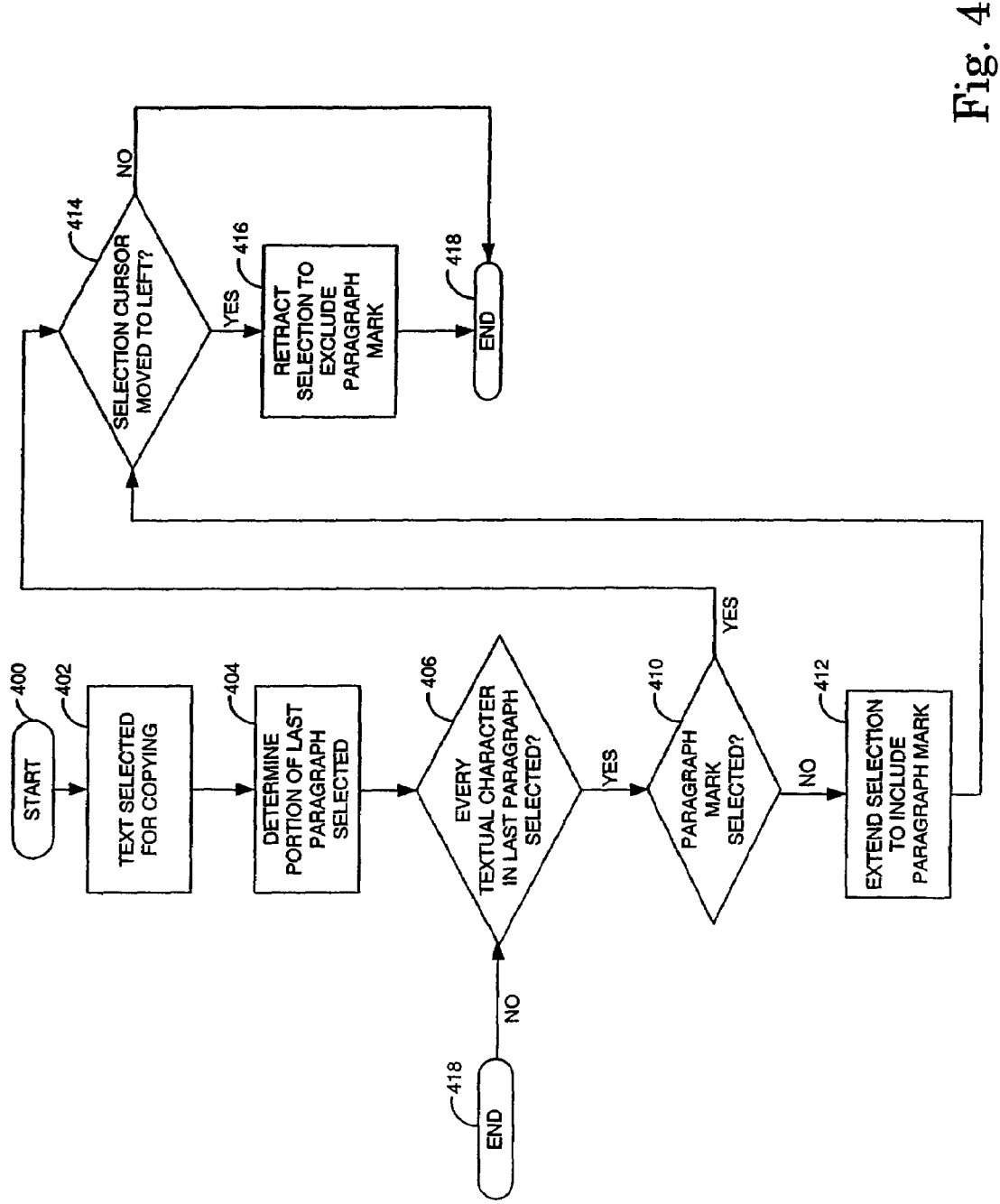
FIG. 4 is a flow chart that depicts an exemplary method for automatically determining whether to include or exclude a paragraph mark from a portion of pasted text.

FIG. 4 is a flow chart that depicts an exemplary method for automatically determining whether to include or exclude a paragraph mark from a portion of pasted text. Often, a user may select and copy or cut a paragraph mark (i.e., return character) inadvertently. When such a user pastes the selected text containing the unwanted paragraph mark, the paragraph mark will create a new paragraph in the target document. If, for example, the user only wanted to add a sentence to an existing paragraph, the paragraph mark would break the target paragraph into two paragraphs. The user would then be required to delete the paragraph mark from the target paragraph to return the target paragraph to its original single-paragraph form.

Conversely, the user may select an entire paragraph with a paragraph mark at the end, intending to create a new paragraph in a target document with the selected paragraph. This user may inadvertently omit the paragraph mark from the end of the selected paragraph. In such a case, the selected text will be pasted into the target document as part of the paragraph into which it is pasted. To remedy this problem, the user must normally find the end of the pasted paragraph and insert a paragraph mark. The method of FIG. 4 begins with step 400 and proceeds to step 402. At step 402, text is selected for copying or cutting (collectively, copying). The method then proceeds to step 404, wherein the portion of the last paragraph selected is determined. In the case of a single paragraph, this step will determine how much of the paragraph was selected for copying. In the case where a user is selecting a group of paragraphs, a determination of the portion of the last paragraph selected will be made. The method proceeds from step 404 to decision block 406. At decision block 406, a determination is made as to whether every textual character in the last paragraph was selected. That is, a determination is made as to whether every visible character in the last paragraph has been selected for copying by the user. If the user has selected every textual character in the last paragraph, it may be assumed that the user intended to copy the paragraph as a paragraph (i.e., with a paragraph mark at the end). If on the other hand the user has selected only a portion of the last paragraph, then it can be assumed that the user only intended to select the selected text and to paste the selected text as part of a paragraph in the existing target document. If a determination is made that not every character in the last paragraph was selected, the method branches to step 418 and ends. If on the other hand, a determination is made that every textual character in the last paragraph was selected, the method branches to decision block 410.

At decision block 410, a determination is made as to whether the paragraph mark was selected. If the paragraph mark was selected, the method branches to decision block 414. If on the other hand, a determination is made that the paragraph mark was not selected, a method branches to step 412. At step 412, the user's selected text is extended to include the un-selected paragraph mark. This step essentially converts the pasted text from a non-paragraph to a paragraph. The method proceeds from step 412 to decision block 414.

At decision block 414 a determination is made as to whether the user moves the selected cursor to the left. If the user never moves the selected cursor to the left, it may be assumed that the user intends to copy the entire paragraph, including the paragraph mark. If, on the other hand, the user moves the selection cursor to the left after the selecting the text, it may be assumed that the user seeks to copy only the text and does not seek to paste the selected text as an independent paragraph in the target document. If a determination is made that the user has not moved the selected cursor to the left, the method branches to step 418 and ends. If, on the other hand, a determination is made that the user has moved the selection cursor to the left, the method branches to step 416. At step 416, the selection is extracted to exclude the paragraph mark, thus converting the selected text from an independent paragraph to a non-paragraph. The method then proceeds to step 418 and ends.

Figure 5:
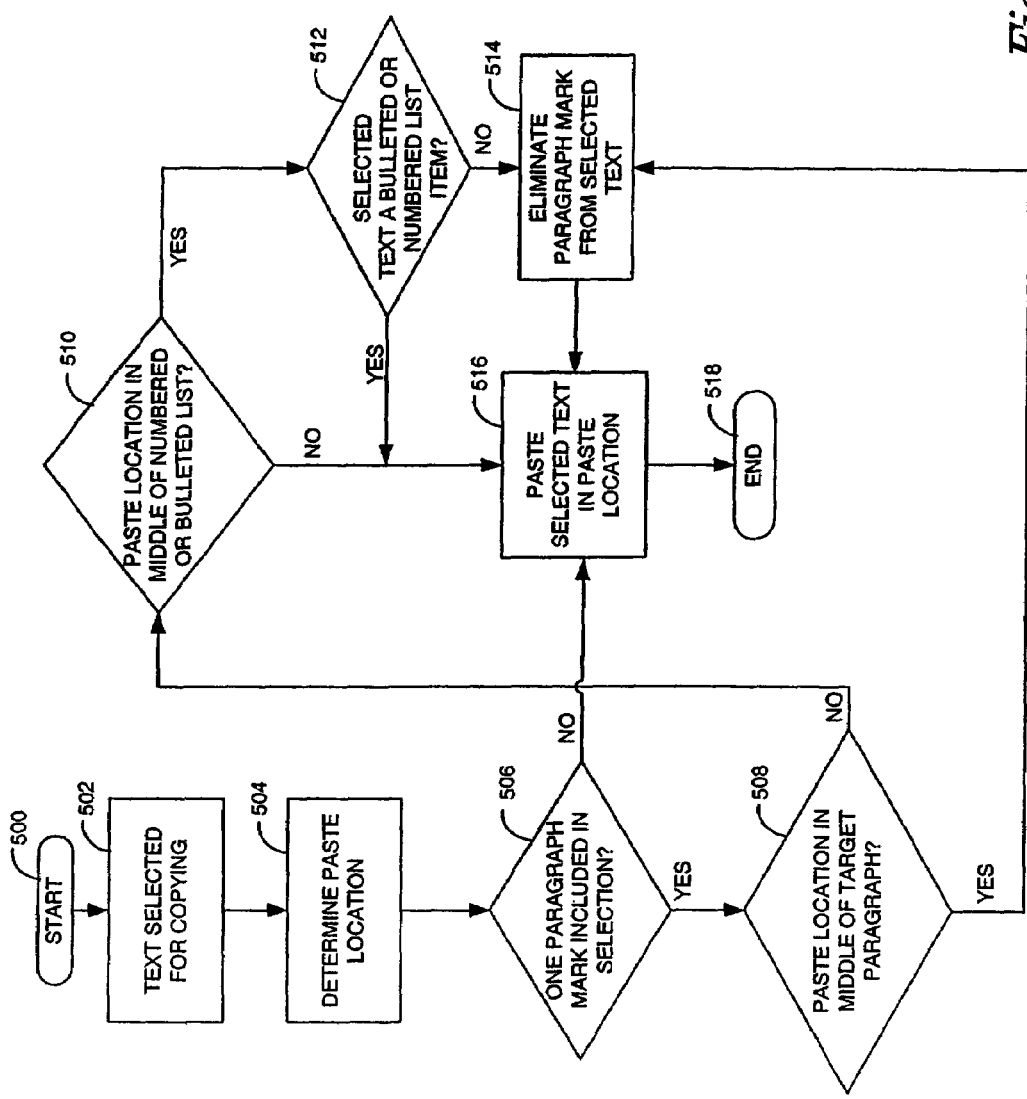
FIG. 5 is a flow chart depicting an exemplary method for recognizing and eliminating an unwanted paragraph mark from selected text.

FIG. 5 is a flow chart depicting an exemplary method for recognizing and eliminating an unwanted paragraph mark from selected text. The method begins at step 500 and proceeds to step 502. At step 502, text is selected for copying or cutting (collectively, copying). The method proceeds to step 504, wherein the paste point is determined. Typically, a user will determine the paste point by placing an insertion cursor at a location within a target document. The method proceeds from step 504 to decision block 506. At decision block 506, a determination is made as to whether one paragraph mark is included in the selected text. If more than one paragraph mark is included in the selected text, it may be assumed that the user intends to paste the selected text as independent paragraphs. On the other hand, if only one paragraph mark was included in the selection, it may be assumed that the user may want to paste the selected text as part of a paragraph existing in the target document, rather than as a new, independent paragraph.

If one paragraph mark is included in the selection, the method branches to decision block 508. If, on the other hand, less than or more than one paragraph mark is included in the selection the method branches to step 516, wherein the selected text is pasted in the paste point. The method proceeds from step 516 to step 518 and ends.

At decision block 508, a determination is made as to whether the paste point is within an existing paragraph in the target document. If the paste point is within the target paragraph, it may be assumed that the user may want the selected text to be pasted as part of the target paragraph. On the other hand, if the paste point is at the beginning or end of paragraphs in the target document, it may be assumed that the user may want to create a new, independent paragraph in the target document. If a determination is made that the paste point is in the middle of a target paragraph, the method branches from decision block 508 to step 514. At step 514, the single paragraph mark in the selected text is eliminated. This elimination will insure that the selected text is pasted as a part of the existing paragraph. The method then proceeds to step 516, wherein the selected text is pasted in the paste point. The method proceeds from step 516 to step 518 and ends.

Returning now to decision block 508, if a determination is made that the paste point is not in the middle of a target paragraph (i.e., the target location is at the beginning or end of one or more paragraphs in the target document), the method branches to decision block 510. At decision block 510, a determination is made as to whether the paste point is within a numbered or bulleted list. If the paste point is not within a numbered or bulleted list, the method branches from decision block 510 to step 516. At step 516, the selected text is pasted at the paste point and the method proceeds to step 518 and ends.

If, at decision block 510, a determination is made that the paste point is within a numbered or bulleted list the method branches to decision block 512. At decision block 512, a determination is made as to whether the selected text was a bulleted or numbered list item in the source document. If a determination is made that the selected text is a bulleted or numbered list item the method branches to step 516 and the selected text is pasted as described above. If, on the other hand, a determination is made at the selected text is not a bulleted or numbered list item, the method branches to step 514. At step 514, the paragraph mark is eliminated from the selected text and the method proceeds to step 516, wherein the selected text is pasted as described above. By determining whether the selected text was originally a bulleted or numbered list item, the method can make an assumption as to whether the user intended to paste the selected text as a new list item or simply as a part of an existing list item.

Figure 6:
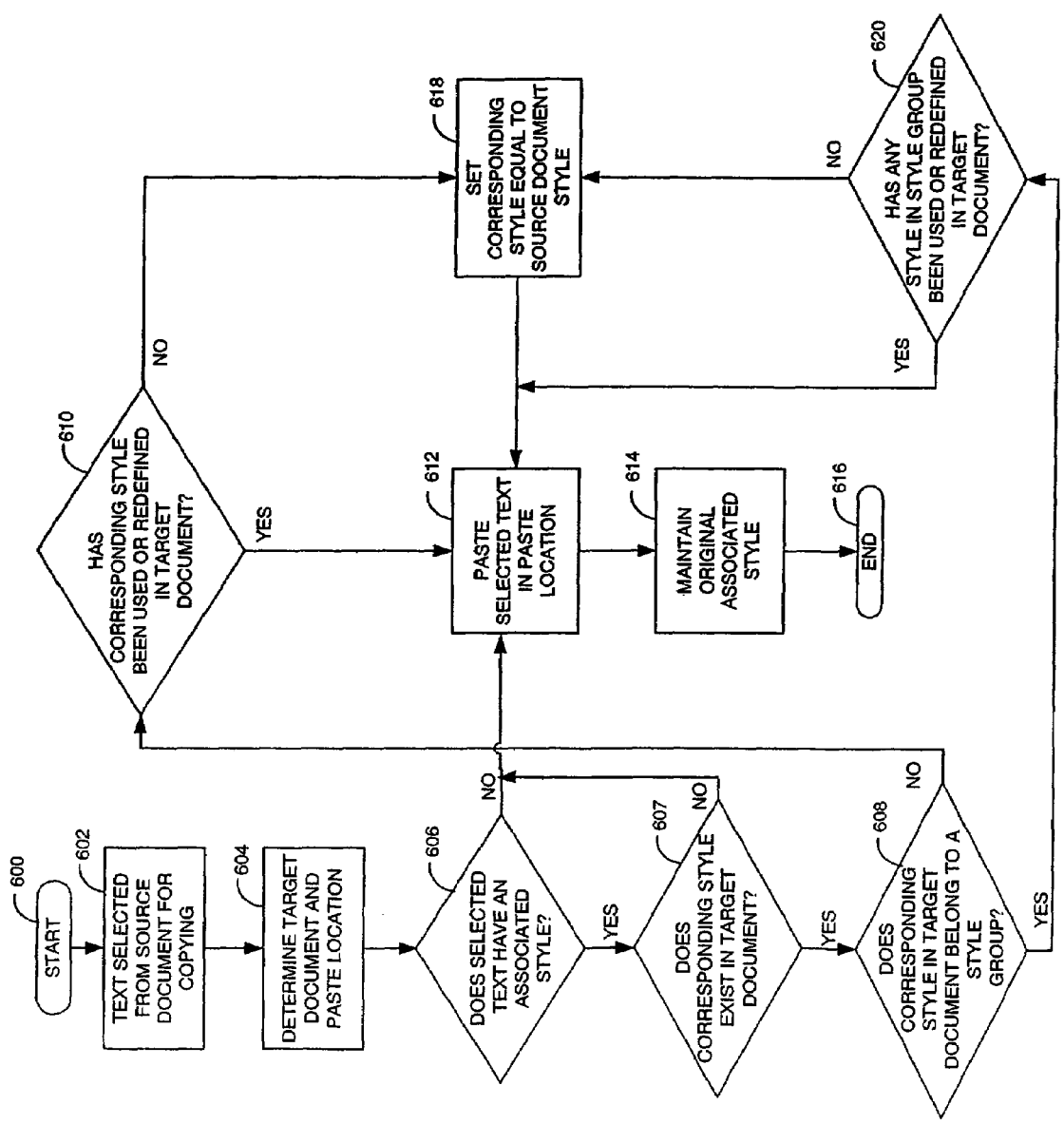
FIG. 6 is a flow chart depicting an exemplary method for redefining styles in a target document.

FIG. 6 is a flow chart depicting an exemplary method for redefining styles in a target document. The method of FIG. 6 starts at step 600 and proceeds to step 602. At step 602, text is selected from a source document for copying or cutting. For the purposes of this description, the term "copying" will be used to describe the function of copying and pasting in the context of a word processor. The method proceeds to step 604, wherein the target document and the paste point within the target document are determined. As described in connection with FIG. 5, this determination is usually made by a user defining an insertion point. The method then proceeds to decision block 606, wherein a determination is made as to whether the selected text has a style associated with the selected text.

Text formatting is typically applied to text in a document as a style or as a direct formatting property. Styles are well known and are simply named collections of formatting properties. Styles may be applied to text to format the text in accordance with the formatting properties that are members of the style. Individualized application of formatting properties to text is referred to as direct formatting. Text may be formatted identically through direct formatting or through the application of a style. Advantageously, styles can be used to insure formatting consistency among portions of a document that have the same style associated with them.

If a determination is made at step 606 that the selected text has an associated style, the method branches to decision block 607. At decision block 607, a determination is made as to whether a corresponding style exists in the target document. If a corresponding style exists in the target document, then the styles must be reconciled. If on the other hand, no corresponding style exists in the target document, the method branches to step 612. At step 612, the selected text is pasted at the paste point. The method proceeds from step 612 to step 614. At step 614, the pasted text is formatted in its original, associated style. The method then proceeds to 616 and ends.

If a determination is made at decision block 607 that a corresponding style exists in the target document, the method branches to decision block 608. At decision block 608, a determination is made as to whether a corresponding style in the target document belongs to a style group. Style groups are well-known collections of styles that are grouped for various reasons. For example, heading styles may be used to associate various heading styles with a particular hierarchy. Such a hierarchy may be used, for example, to create an ordered table of contents. If, on the other hand, a determination is made that a corresponding style does not exist in the target document, the method branches from decision block 607 to step 612 and proceeds as described above.

If, at decision block 608, a determination is made that the corresponding style does not belong to a style group, the method proceeds to decision block 610. At decision block 610, a determination is made as to whether the corresponding style as been used or redefined in the target document. If the corresponding style has not been used or redefined in the target document then the style of the selected text can be used to redefine the corresponding style. In this case, the method branches from decision block 610 to step 618. At step 618, the corresponding style is set equal to the source document style (i.e., the style of the selected text). The method then proceeds to step 612 and proceeds as described above. Returning now to decision block 610, if the corresponding style has been used or redefined in the target document, the style in the target document will not be redefined to match the style of the selected text. In this case, the method branches from decision block 610 to step 612 and proceeds as described above. Notably, the pasted text will maintain its original style, but the style in the target document will not, nonetheless, be redefined.

Returning now to decision block 608, if a determination is made that the corresponding style in the target document belongs to a style group, the method branches to decision block 620. At decision block 620, a determination is made as to whether any style in the style group has been used or redefined in the target document. If any style in the style group has been used or redefined in the target document, then it may be assumed that the user may want to retain the definitions of the styles in the style group. In this case, the method branches from decision block 620 to step 612 and proceeds as described above. If, on the other hand, no style in the style group has been used or redefined in the target document, the method branches from decision block 620 to step 618. At step 618, the corresponding style is set equal to the source document style, as described above. The method then proceeds to step 612 and the selected text is pasted in the paste point.

Although the method of FIG. 6 describes maintaining the pasted text in its original style, it will be appreciated by those skilled in the art that the pasted text may be reconfigured to adopt the formatting properties of the corresponding style. This option may be selected by the user in a preferences file or may be selected by user using an OOUI, as described above on a case-by-case basis. Additionally, the method of FIG. 6 may be modified within the scope of the present invention to include the step of displaying a recovery user interface to enable the selection of recovery actions associated with the performance of a particular paste action and/or style reformatting (e.g., after step 612). In one embodiment of the present invention, one such recovery action includes negating an automatic application of a source document style and the application of a corresponding target document style to the pasted text or vice versa.

Figure 7:
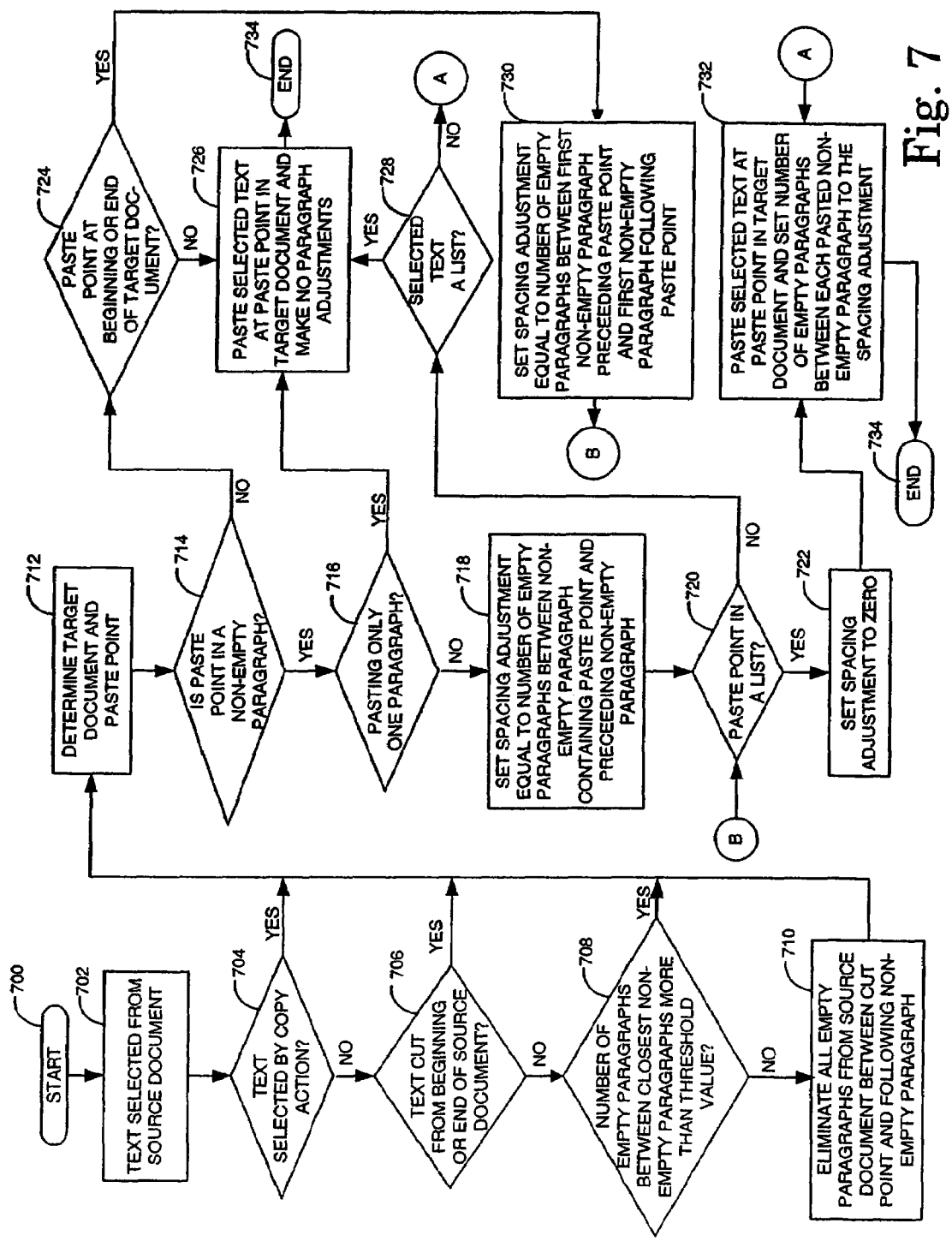
FIG. 7 is a flow chart depicting an exemplary method for eliminating empty paragraphs from target and source documents.

FIG. 7 is a flow chart depicting an exemplary method for eliminating empty paragraphs from target and source documents. Often, a user will cut text from a source document for pasting into a target document, but will leave the source document with unwanted empty paragraphs. Additionally, when a user pastes text into a target document the user will often paste unwanted paragraphs into the target document. The method of FIG. 7 can determine when it is most likely that the user intended to eliminate an empty paragraph from either the selected (copied or cut) text or from the pasted text.

The method starts at step 700 and proceeds to step 702. At step 702, text is selected from the source document for cutting or copying. The method then proceeds to decision block 704, wherein a determination is made as to whether the text selection was made by a copy action. If the text selection was made by a copying action, the method branches to step 712. If, on the other hand, the text was not selected by a copying action (i.e., the text was selected by a cut action), the method branches to decision block 706.

At decision block 706, a determination is made as to whether the text was cut from the beginning or end of the source document. If the text was cut from either the beginning or the end of the source document, the method branches to step 712. If, on the other hand, the text was not cut from either the beginning or the end of the source document, the method branches to decision block 708. At decision block 708, a determination is made as to whether the number of empty paragraphs between the closest non-empty paragraphs are more than a pre-defined threshold value. The pre-defined threshold value may simply be an estimate as to the number of empty paragraphs present in the source document that may indicate that the user intends to remove empty paragraphs from the source document by virtue of the cutting action. If the number of empty paragraphs is more than the pre-defined threshold value, the method branches to step 712. If the number of empty paragraphs is less than or equal to the threshold value, the method branches to step 710.

At step 710, all empty paragraphs found between the cut point and the next (following) non-empty paragraph are eliminated from the source document. Naturally, this step is performed when a determination is made (by decision block 708) that the user intended for the empty paragraphs to be removed from the source document. The method proceeds from step 710 to step 712. At step 712, the target document and paste point are determined. Typically, this will be performed by a user opening and/or instantiating a target document and selecting a paste point with a pointing device, such as a mouse.

The method proceeds from step 712 to decision block 714. At decision block 714, a determination is made as to whether the paste point is in a non-empty paragraph. If the paste point is not in a non-empty paragraph, the method branches to decision block 724. At decision block 724, a determination is made as to whether the paste point is at the beginning or the end of the target document. If the paste point is not at either the beginning or the end of the target document, the method branches to step 726. At step 726, the selected text (i.e., the copied text or the cut text) is pasted in the target document at the paste point and no paragraph adjustments are made to the text in the target document. The method proceeds from step 726 to step 734 and ends.

Returning now to decision block 714, if a determination is made that the paste point is in a non-empty paragraph, the method branches to decision block 716. At decision block 716, a determination is made as to whether the selected text consists of only one paragraph. If the selected text consists of only one paragraph, the method branches to step 726 and proceeds as described above. If, on the other hand, a determination is made at decision block 716 that the selected text consists of more than one paragraph, the method branches to step 718. At step 718, a spacing adjustment is set equal to the number of empty paragraphs between the non-empty paragraph containing the paste point and a preceding non-empty paragraph.

The method proceeds from step 718 to decision block 720. At decision block 720, a determination is made as to whether the paste point is located in a list of the target document. If the paste point is located in a list, then the spacing adjustment is set to zero. The method proceeds from step 722 to step 732. At step 732, the selected text is pasted at the paste point and the target document and the number of paragraphs between each pasted non-empty paragraph is set to the spacing adjustment determined above (e.g., step 718, step 722). The method then proceeds to step 734 and ends. Notably, and an alternative embodiment, a determination can be made as to whether the spacing adjustment is greater than a predefined threshold value. If the spacing adjustment is greater than that pre-defined threshold value, the spacing adjustment can be set equal to the pre-defined threshold value.

Returning to decision block 720, if a determination is made that the paste point is not in a list, the method branches to decision block 728. At decision block 728, a determination is made as to whether the selected text is itself a list. If a determination is made that the selected text is a list, a method branches to step 726 and the selected text is pasted as the paste point with no paragraph spacing adjustments. The method then proceeds to step 734 and ends.

If, on the other hand, a determination is made at decision block 728 that the selected text is not a list, the method branches to step 732. At step 732, the selected text is pasted in the target document at the paste point and the number of empty paragraphs between each pasted non-empty paragraph is set to the spacing adjustment determined above (i.e., step 718). The method then proceeds to step 734 and ends. Returning now to decision block 724, if a determination is made that the paste point is at the beginning or the end of the target document, the method branches from decision block 724 to step 730. At step 730, the spacing adjustment is set equal to the number of empty paragraphs between the first non-empty paragraph preceding the paste point and the first non-empty paragraph following the paste point. The method then proceeds to decision block 720 and proceeds as described above.

Step 710 is also performed when the method branches from decision blocks 704, 706, and 708. If, at decision block 704, a determination is made that the selected text was selected by way of a copy action, then the method branches to step 712 to determine the target document and paste point. Because no cutting action is involved, there is no need to perform step 710, which eliminates empty paragraphs from the source document. Likewise, when a determination is made at decision block 706 that the selected text was cut from the beginning or end of the source document, an assumption is made that empty paragraphs need not be removed, and the method branches around step 710 to step 712. Finally, where a determination is made at decision block 708 that the number of empty paragraphs between the closest (to the cut point) non-empty paragraphs is greater than the predefined threshold value, then an assumption is made that not empty paragraphs need to be removed. Thus, the method branches from decision block 708 to step 712.

As described, the method of FIG. 7 analyzes the selected text from a source document, the selection action (e.g., cutting or copying), and the paste point in the target document to determine whether empty paragraphs should be eliminated from either document during a cut/copy and/or paste operation. When the selected text is at the beginning or end of the source document, the selected text will be cut from the source document without any paragraph elimination. Similarly, if the paste point is at the beginning or end of the target document, the selected text will be pasted without any empty paragraph elimination. The threshold values for cutting and/or pasting may be predetermined by a hard-coded configuration file, a configurable user preferences file, or an options dialog box. Essentially, however, the threshold value is simply an estimate as to the number of preceding or following paragraphs that will be recognized as an indication that a user intends for empty paragraphs to be present.

Figure 8:
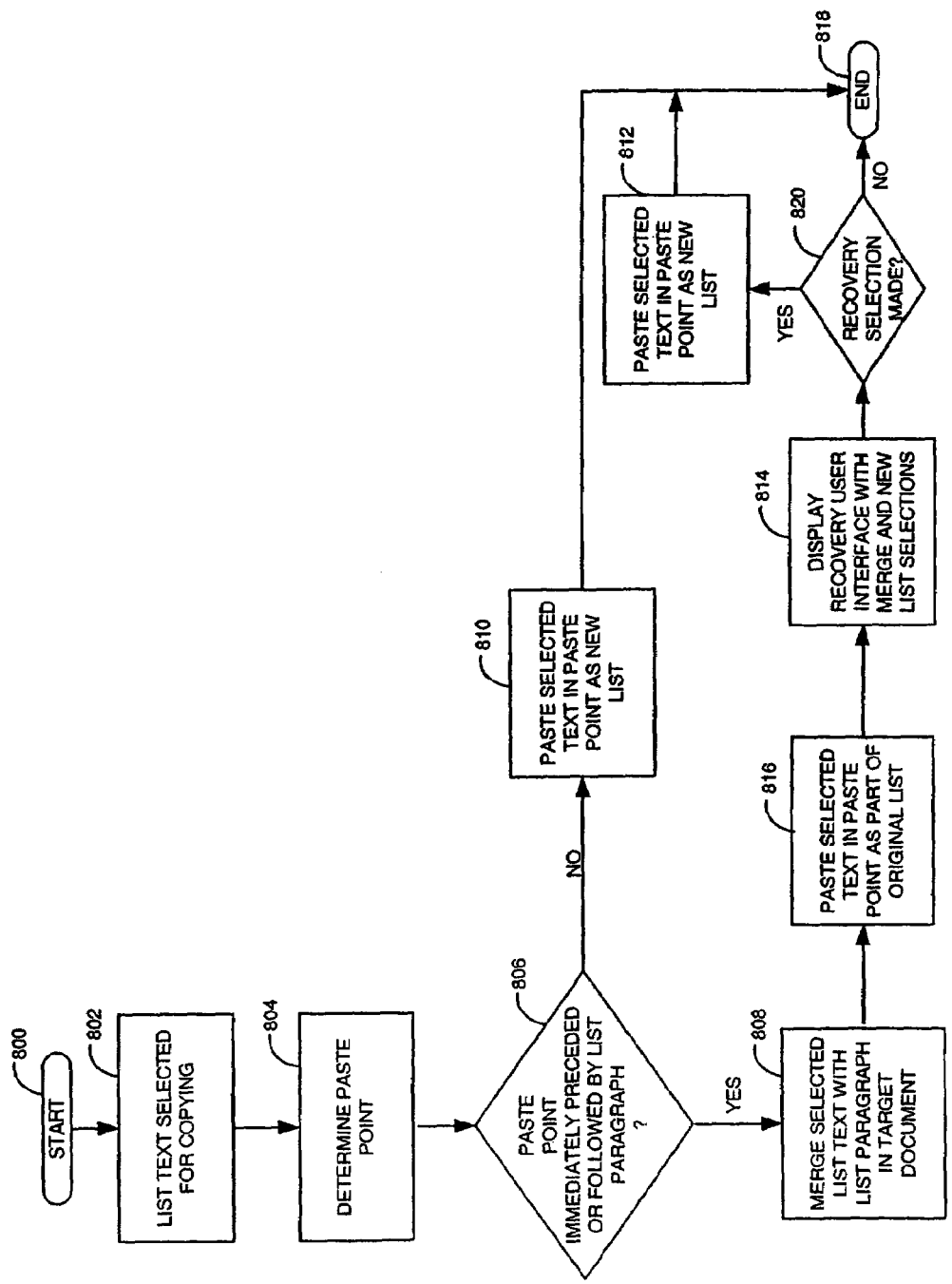
FIG. 8 is a flow chart that depicts an exemplary method for merging and creating lists, in response to a paste operation.

FIG. 8 is a flow chart that depicts an exemplary method for merging and creating lists, in response to a paste operation. The method starts at 800 and proceeds to step 802. At step 802, the list text is selected for copying. List text is text that is an item in a numbered or bulleted list. The list text may be a portion of a list item (i.e., not containing a paragraph mark) or an entire list item (i.e. containing at least one paragraph mark).

The method proceeds from step 802 to step 804. At step 804, the paste point is determined. Typically, the paste point will be determined by a user's defining an insertion point in a target document. The method proceeds from step 804 to decision block 806. At decision block 806, a determination is made as to whether the paste point is immediately preceded or followed by a list paragraph. That is, it is determined whether the paste point is next to a list item in a list. If the paste point is immediately preceded or followed by a list paragraph (i.e., list item), the method branches to step 808. At step 808, the selected list text is merged with the list in which the list paragraph resides. That is, the pasted text is made part of the existing list in the target document. Merging the selected text with the existing list may also include formatting the selected list text as the existing list is formatted.

The method proceeds from step 808 to step 816 and the selected text is pasted into the target document at the paste point as part of the existing list preceding or following the paste point. At step 816, an assumption is made that the user intends for the pasted list text to be made part of the existing list. Those skilled in the art will appreciate that an alternative embodiment of the present invention could use another default assumption, such as making the pasted text a new, independent list.

The method proceeds from step 816 to step 814 and a recovery user interface is displayed. In one embodiment of the present invention, the recovery interface may provide the options to merge the pasted list text as part of the target document's existing list or to make the pasted list text a new, independent list. Of course, other recovery options also may be provided. The method proceeds from step 814 to decision block 820. At decision block 820, a determination is made as to whether a recovery selection is made. If a recovery selection is made, the method branches to step 812 and the selected recovery action is performed. In the example of FIG. 8, step 812 formats the pasted text as a new, independent list as a recovery action corresponding to the default action performed in step 816 (pasting the selected text as a part of the original list). The method proceeds from step 812 to step 818 and ends. If a determination is made at decision block 820 that no recovery action is selected, the method branches to step 818 and ends.

Returning now to decision 806, if a determination is made that the paste point is not immediately preceded or followed by a list paragraph, the method branches to step 810, the selected list text is pasted at the paste point as a new, independent list. The method then proceeds to step 818 and ends.

Figure 9:
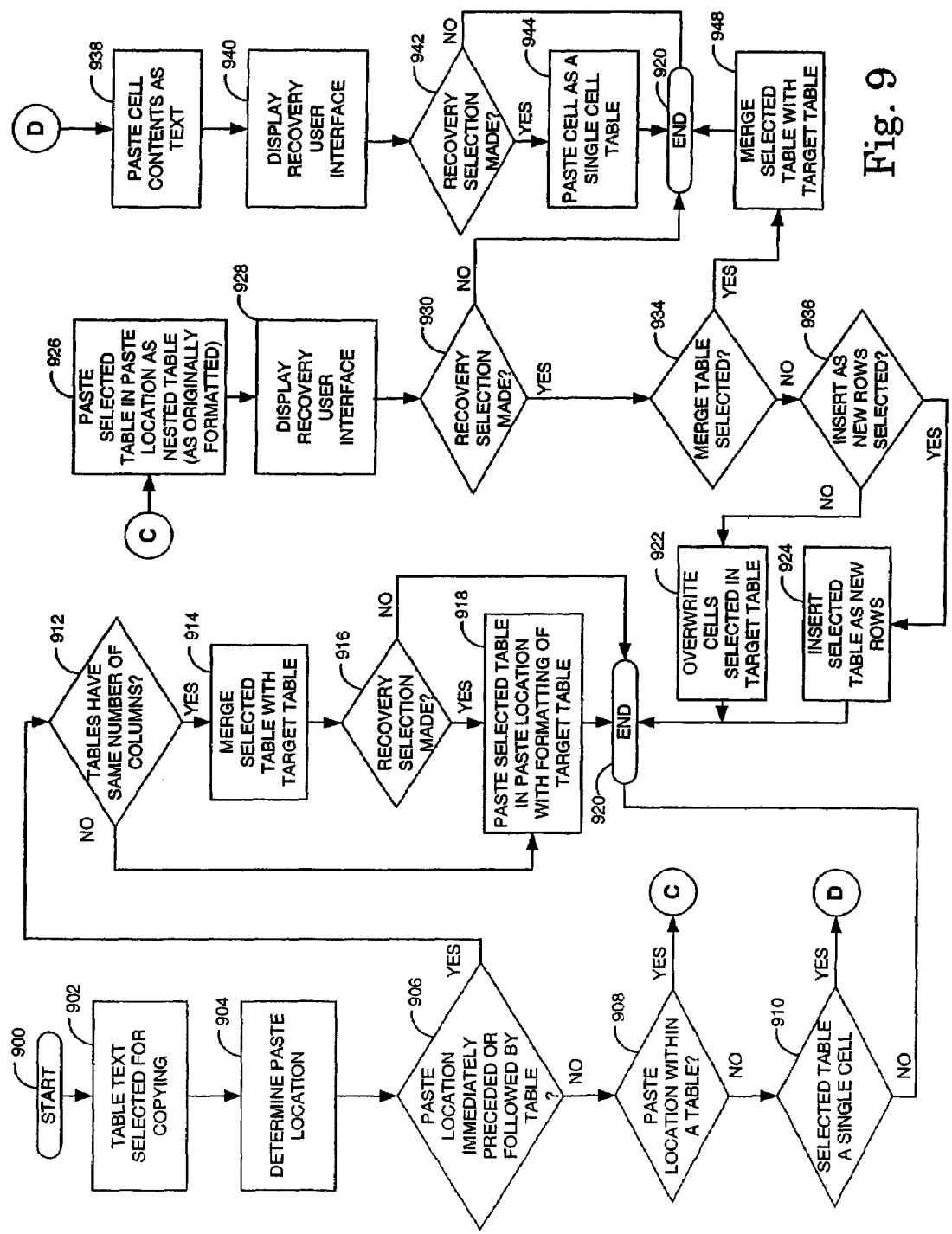
FIG. 9 is a flow chart depicting an exemplary method for formatting a table, in response to copy and paste operations.

FIG. 9 is a flow chart depicting an exemplary method for formatting a table, in response to copy and paste operation. The method of FIG. 9 starts at step 900 and proceeds to step 902. At step 902, table text is selected for copying or cutting (collectively, copying). Table text is any text that is at least part of a table in a source document. Tables are typically divided into columns and rows of cells. Oftentimes, when table text is copied and pasted, it is difficult to determine whether it is intended to be pasted as a new table, part of an existing table, or simply as non-table text. The method of FIG. 9 automatically selects between these options, based on the location of the selected table text, the paste point and the actions of the user with respect to a recovery user interface.

The method proceeds from step 902 to step 904. In step 904, the paste point is determined. Typically, the paste point will be determined by the user's placement of an insertion point cursor in the target document. The method proceeds from step 904 to decision block 906. At decision block 906, a determination is made as to whether the paste point is an immediately preceded or followed by a table. If the paste point is not immediately preceded or followed by a table, the method branches to decision block 908. At decision block 908, a determination is made as to whether the paste point is within a table. If the paste point is not within a table, the method branches to step 910. At step 910, a determination is made as to whether the selected table text is a single cell. If the selected table text is not a single cell, the method branches to step 920 and ends.

Returning now to decision block 906, if a determination is made that the paste location is immediately preceded or followed by a table, the method branches to decision block 912. At decision block 912, a determination is made as to whether the selected table text and the preceding or following table have the same number of columns. If the selected table text and the existing table do not have the same number of columns, the method branches from decision block 912 to step 918. At step 918, the selected table text is pasted at the paste point and is formatted as the target table is formatted. The method then proceeds from step 918 to step 920 and ends.

Returning now to decision block 912, if a determination is made that the selected table text and the existing table have the same number of columns, the method branches to step 914. At step 914 the selected table text is merged with the target table. The merger of the table elements creates a single table and pasted table text will have the same table formatting as the existing table. The method proceeds from step 914 to 916. At decision block 916, a determination is made as to whether a recovery action has been selected. Typically, the recovery action will be made available via an OOUI (not shown). If no recovery action is selected, the method branches from decision block 916 to step 920 and ends. If, on the other hand, the user selects a recovery action, the method will branch to step 918 and the selected table text will be pasted in the paste point as originally formatted.

Thus, the table merger of step 914 will be overridden by the selection of the recovery action. The method proceeds from step 918 to 920 and ends.

Returning now to step 908, if a determination is made that the paste point is within an existing table, the method branches to step 926. At step 926, the selected table is pasted in the pasted location as a nested table. That is, the pasted table text will be an independent table within the existing table. Notably, the selected table text will be pasted as it was originally formatted in the source document. The method proceeds from step 926 to step 928. At step 928, a recovery user interface (e.g., an OOUI) is displayed. The method then proceeds to decision block 930. At decision block 930, a determination is made as to whether the user selects a recovery action from the recovery user interface. If no recovery selection is made, the method branches to step 920 and ends. If, on the other hand a determination is made at decision 930 that a recovery action has been selected, the method branches to decision block 934.

At decision block 934, a determination is made as to whether the merge table recovery action has been selected. If the merge table recovery action has been selected, the method branches from decision block 934 to step 948. At step 948, the selected table text is merged with the existing table (i.e., the target table). As described above, the selected table text will be formatted in accordance with the target table. The method then proceeds to step 920 and ends.

Returning now to decision block 934, if a determination is made at decision block 934 that the merge table recovery action has not been selected, the method branches to decision block 936. At decision block 936, a determination is made as to whether the insert as new rows recovery action is selected by the user. If the insert as new rows recovery action is selected by the user, the method branches to step 924. At step 924, the selected table text is inserted within the target table as new rows. Obviously, the columns may or may not line up with the columns of the columns of the target table. The method proceeds from step 924 to step 920 and ends.

Notably, if a determination is made at decision block 936 that the insert as new rows recovery action has not been selected, the method branches from decision block 936 to step 922. At step 922 the selected table text is pasted into the target table by overwriting existing cells. The method proceeds from step 922 to 920 and ends.

Returning now to decision block 910, if a determination is made that the selected table text is a single cell, the method branches to step 938. At step 938, the cell contents are pasted as regular text at the paste point. The method proceeds to step 940, wherein a recovery user interface is displayed. The method proceeds from step 940 to decision block 942. At decision block 942, a determination is made as to whether a recovery action is selected. If no recovery action is selected, the method branches to step 920 and ends. On the other hand, if a recovery action is selected, the method branches to step 944. At step 944, the cell is pasted as a single cell table. The method proceeds from step 944 to 920 and ends.

Figure 10:
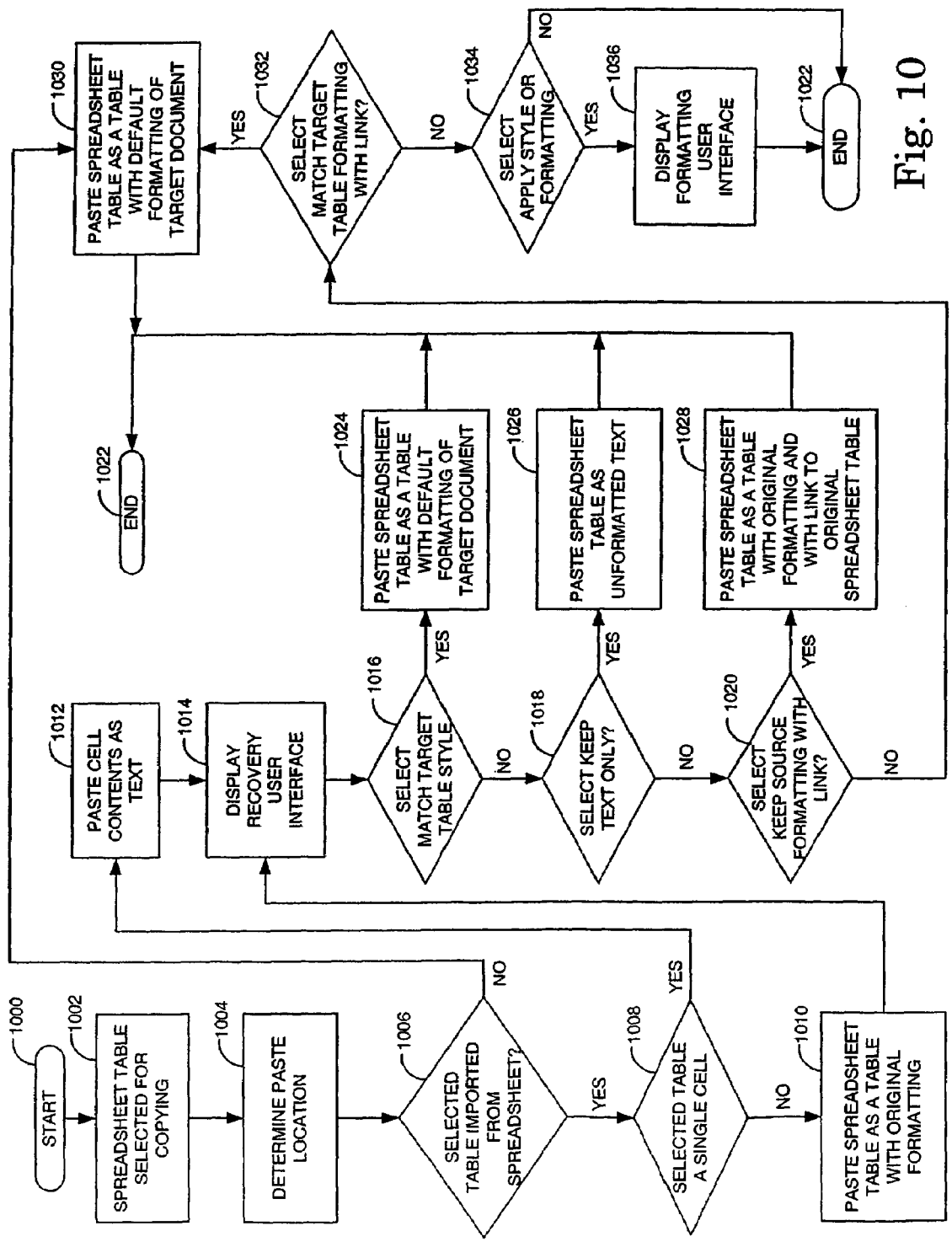
FIG. 10 is a flow chart depicting an exemplary method for pasting spreadsheet elements.

FIG. 10 is a flow chart depicting an exemplary method for pasting spreadsheet elements. The method of FIG. 10 starts at step 1000 and proceeds to step 1002. At step 1002, at least a portion of a spreadsheet table is selected for copying or cutting (collectively, copying). The spreadsheet table may be in a document hosted by a spreadsheet application program (such as Microsoft Excel, marketed and manufactured by Microsoft Corporation of Redmond, Wash.) or may be a spreadsheet object embedded in a source document. In either case, the spreadsheet functionality may be imported into the target document maintaining a link with the spreadsheet. On the other hand, a non-functional spreadsheet table of values may be pasted into the target document.

The method proceeds from step 1002 to step 1004. At step 1004, a paste point is determined. Typically the paste point is determined by the user defining an insertion point in the target document. The method proceeds from step 1004 to decision block 1006. At decision block 1006, a determination is made as to whether the selected table has been imported from a spreadsheet. If the table has not been imported from a spreadsheet, then the method branches to step 1030 and the spreadsheet is simple pasted as a table with the default formatting of the target document. On the other hand, if a determination is made at decision block 1006 that the selected table is imported from a spreadsheet, the method branches to decision block 1008. At decision block 1008, a determination is made as to whether the selected table is a single cell table. If the selected table is not a single cell table, the method branches to step 1010. At step 1010, the spreadsheet is pasted in the target document as a table with its original formatting. The method then proceeds to step 1014.

Returning now to decision block 1008, if a determination is made that the selected table is a single cell table, a method branches to step 1012. At step 1012, the cell contents are simple pasted in the target document as text. The method then proceeds to step 1014. At step 1014, a recovery user interface is displayed. The method then proceeds to decision block 1016. At decision block 1016, a determination is made as to whether a match target table style recovery action is selected from the recovery user interface. If the matched target table style recovery action is selected, the method branches from decision block 1016 to step 1024. At step 1024, the spreadsheet table is pasted as a table with the default formatting of the target document then proceeds to step 1022 and ends.

If at decision block 1016, a determination is made that the user has not selected the matched target table style recovery action, the method branches to decision block 1018. At decision block 1018 a determination is made as to whether the user has selected the keep text only recovery action. If the user has selected the keep text only recovery action, the method branches to step 1026. At step 1026, the spreadsheet table is pasted as unformatted text. The method then proceeds to step 1022 and ends. If, on the other hand, at decision block 1018 a determination is made that the user has not selected the keep text only recovery action, the method branches to decision block 1020. At decision block 1020, a determination is made as to whether the user has selected the keep source formatting with link recovery action. If the user has selected this recovery action, the method branches to step 1028. At step 1028, the spreadsheet table is pasted as a table with its original formatting and with a link to the original spreadsheet table. This link will maintain the functionality of the spreadsheet within the target document so that changes to the original spreadsheet will be reflected in the pasted spreadsheet table. The method then proceeds to step 1022 and ends. If at decision block 1020, a determination is made that the user has not selected the keep source formatting with link recovery action, the method branches to decision block 1032.

At decision block 1032, a determination is made as to whether the user has selected the match target table formatting with link recovery action. If the user has selected this recovery action, the method branches to step 1030. At step 1030, the spreadsheet table as pasted as a table with the default formatting of the target document. The method then proceeds to step 1022 and ends.

If at decision block 1032, a determination is made that the user has not selected the match target table formatting with link recovery action, the method branches to decision block 1034. At decision block 1034, a determination is made as to whether the apply style or formatting recovery action has been selected. If this recovery action has been selected, the method branches to step 1036. At step 1036, a formatting user interface is displayed with which the user may format the selected table text. A detailed description of the formatting user interface is described in a co-pending U.S. patent application Ser. No. 09/8766,489, also assigned to Microsoft Corporation of Redmond, Wash. That patent application is entitled "INTERACTIVE FORMATTING INTERFACE" and is hereby incorporated by reference. The method of FIG. 10 proceeds from step 1036 to step 1038 and ends. Returning to decision block 1034, if a determination is made that the user has not selected the apply style or formatting recovery action, then it is assumed that the user has not selected a recovery action in the method branches to step 1038 and ends.

In an alternative embodiment of the present invention, the methods of FIGS. 9 and 10 can be integrated, such that the pasting of a spreadsheet table (FIG. 10) can be processed identically as any other table processed according to the method of FIG. 9. In this embodiment, the method of FIG. 10 is modified to follow the "NO" branch from decision block 1006 to step 904 of the method of FIG. 9. The method of FIG. 10 could be further modified by following the "YES" branch from decision block 1006 to a new decision block that determines whether the paste point is immediately preceded or followed by a table. If it is determined that the paste point is immediately preceded or followed by a table, then the method of this embodiment would branch to step 926 of FIG. 9. If it is determined that the paste point is not immediately preceded or followed by a table, then the method would branch to a second new decision block, wherein a determination is made as to whether the paste point is within a table. If the paste point is within a table, the method branches to step 938 of FIG. 9. If the paste point is not within a table, then the method branches to step 1008 of FIG. 10.

Figure 11:
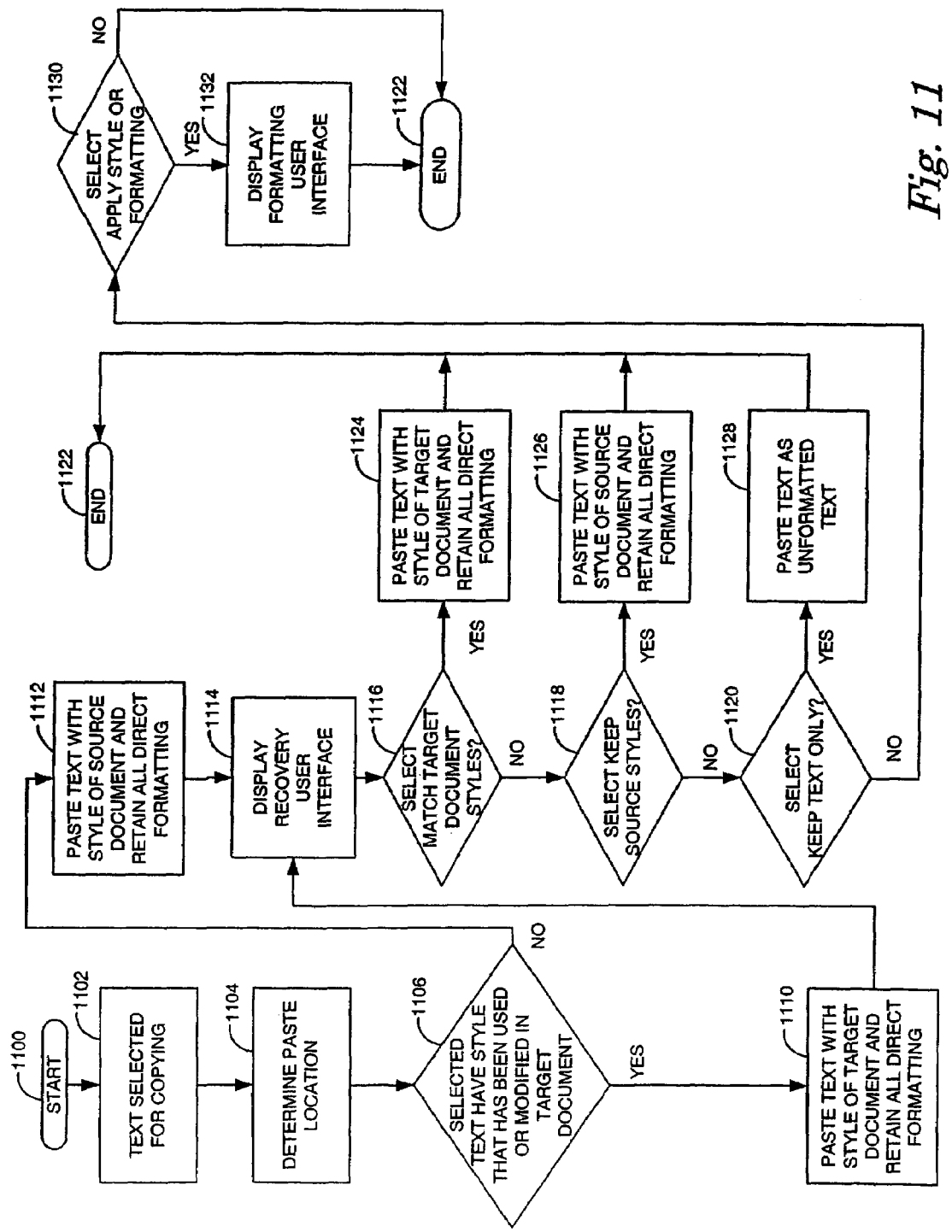
FIG. 11 is flow chart depicting an exemplary method for automatically adjusting the formatting of pasted text.

FIG. 11 is flow chart depicting an exemplary method for automatically adjusting the formatting of pasted text. Like the method depicted in FIG. 6, the method of FIG. 11 provides automatic format adjustment for pasted text. However, the method of FIG. 11 also provides a recovery user interface that allows the reversal of an automatic formatting.

The method of FIG. 11 starts at step 1100 and proceeds to step 1102. At step 1102, text is selected for a copying or cutting. The method then proceeds to step 1104. At step 1104, the paste point is determined. The method then proceeds from step 1104 to decision block 1106.

At decision block 1106, a determination is made as to whether the selected text has an associated style that has been used and/or modified in the target document. If the selected text has such a style, the method branches to step 1110. At step 1110, the text is pasted at the paste point with the style of the target document. Any direct formatting that has been applied to the pasted text (in the source document) is retained. The method proceeds from step 1110 to step 1114. If at decision block 1106, a determination is made that the selected text is not associated with a style that has been used or modified in the target document, the method branches to step 1112. At step 1112, the selected text is pasted at the paste point with the style of the source document and all direct formatting is retained. The method then proceeds to step 1114.

At step 1114, a recovery user interface is displayed. The method proceeds from step 1114 to decision block 1116. At decision block 1116, a determination is made as to whether the match target document styles recovery action is selected from the recovery user interface. If the matched target document styles recovery action is selected, the method branches to step 1124. At step 1124, the selected text is pasted at the paste point with the style of the target document and all direct formatting is retained. The method then proceeds to step 1122 and ends.

If at decision block 1116, a determination is made that the match target document styles recovery action is not selected, the method branches to decision block 1118. At decision block 1118, a determination is made as to whether the keep source styles recovery option is selected. If this recovery option is selected, the method branches to step 1126. At step 1126, the selected text is pasted at the paste point with the style of the source document and all direct formatting is retained. The method then proceeds to step 1122 and ends.

If at decision block 1118, a determination is made that the keep source styles recovery action is not selected, the method branches to decision block 1120. At decision block 1120, a determination is made as to whether the keep text only recovery action has been selected. If this recovery action has been selected, the method branches to step 1128 and the selected text is pasted at the paste point as unformatted text. The method then proceeds to step 1122 and ends.

If a determination is made as decision block 1120 that the keep text only recovery action had not been selected, the method branches to decision block 1130. At decision block 1130, a determination is made as to whether the apply style or formatting recovery action has been selected. If this recovery action has been selected, the method proceeds to step 1132. If this recovery action has not been selected, the method branches to step 1122 and ends. At step 1132, the formatting user interface described above in connection with FIG. 10 is displayed. This user interface allows the user to format the selected text as desired. The method proceeds from step 1132 to step 1122 and ends.

The method of FIG. 11 also could be modified to include other recovery options in addition to the recovery actions provided by step 1124 (matching the styles of the target document), step 1126 (keeping source formatting), and step 1128 (keeping the source text only). For example, a recovery action that preserves the styles of the source document could be added (like step 1112). Those skilled in the art will appreciate that various recovery options could be added to the recovery user interface within the scope of the present invention.

Figure 12:
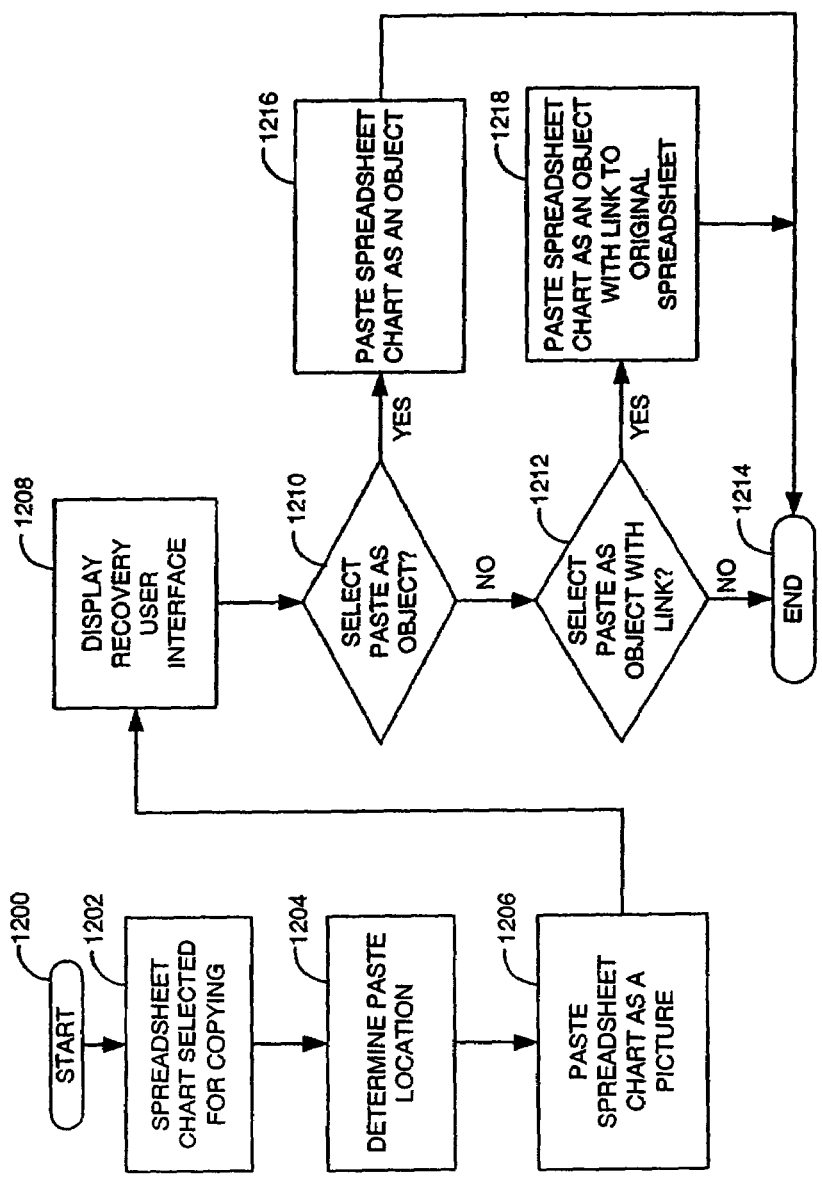
FIG. 12 is a flow chart depicting an exemplary method for pasting a spreadsheet chart into a document.

FIG. 12 is a flow chart depicting an exemplary method for pasting a spreadsheet chart into a document. The method of FIG. 12 starts at step 1200 and proceeds to step 1202, the spreadsheet chart is selected for copying. A spreadsheet chart is generally a graphical representation of data in a spreadsheet. If the spreadsheet chart is pasted as an object or with a link, the spreadsheet chart may retain its functionality. If the spreadsheet chart is pasted as a picture, the original values will be retained, but the functionality of the chart will not be retained.

The method proceeds from step 1202 to 1204. At step 1204, a paste point is determined. The method then proceeds to step 1206. At step 1206, the spreadsheet chart is pasted into the target document as a picture. The method proceeds from step 1206 to step 1208.

At step 1208, a recovery user interface is displayed. The method proceeds to decision block 1210, wherein a determination is made as to whether the paste as object recovery action has been selected from the recovery user interface. If this recovery action has been selected, the method branches to step 1216. If this recovery action has not been selected, the method branches to decision block 1212. At step 1216, the spreadsheet chart is pasted into the target document as an object. Those skilled in the art will appreciate that an object will maintain all or portion of the functionality of the application program in which the spreadsheet chart was created. The method proceeds from step 1216 to 1214 and ends.

If a determination is made at decision block 1210 that the paste as object recovery action has not been selected, the method branches to decision block 1212. At decision block 1212, a determination is made as to whether the paste as object with link recovery action has been selected. If this recovery action has been selected, the method branches to step 1218. If this recovery action has not been selected, the method branches to step 1214 and ends. At step 1218, the spreadsheet chart is pasted as an object with a link to the original spreadsheet. The link will insure that changes to the original spreadsheet will be reflected in the pasted spreadsheet chart. The method proceeds from step 1218 to step 1214 and ends.

Although the present invention has been described in connection with various exemplary embodiments, those of ordinary skill in the art will understand that many modifications can be made thereto within the scope of the claims that follow. For example, although the embodiments of the present invention have been described in which the formatting component and formatting rules component are independent components, those skilled in the art will appreciate that the invention may be implemented such that these components are integral parts of the document editor. Accordingly, it is not intended that the scope of the invention in any way be limited by the above description, but instead be determined entirely by reference to the claims that follow.

What is claimed is:

1. A computer-readable storage medium having stored thereon computer-executable instructions which, when executed by a computer, cause the computer to:
   determine the selection of a document element having an associated formatting style, wherein the selected document element traverses a plurality of paragraphs;
   determine a portion of a first paragraph corresponding to the selected document element, the first paragraph comprising a last paragraph in the plurality of traversed paragraphs;
   determine whether a paragraph mark is included in the first paragraph in the selected document element;
   add the paragraph mark to the selected document element in response to a determination that the entire first paragraph has been selected and that the paragraph mark has not been included in the first paragraph in the selected document element wherein determining that the entire first paragraph has been selected comprises determining that every visible character in the first paragraph has been selected for copying by a user wherein every visible character in the first paragraph being selected for copying by the user indicates that the user marks the first paragraph to be copied as a paragraph;

determine a paste point in a target document having a corresponding formatting style, wherein having the corresponding formatting style comprises having a same style name;

determine whether the corresponding formatting style belongs to a formatting style group;

determine whether a member formatting style in the formatting style group has been redefined in the target document;

paste the document element as an independent paragraph if the entire first paragraph has been selected and no selection action has been made that indicates a desire to de-select the paragraph mark;

apply an associated style to the pasted document element, wherein applying the associated style to the pasted document element comprises resolving a style conflict between the document element and the target document; and redefine the associated style, in response to the determination that the member formatting style in the formatting style group has been redefined in the target document and that the corresponding formatting style and the associated formatting style are not identical.

2. The computer-readable storage medium of claim 1, further comprising computer-executable instructions stored thereon which, when executed by a computer, cause the computer to:

determine whether the selection action indicates de-selecting the paragraph mark; and eliminate the paragraph mark from the selected document element in response to a determination that the selection action indicates a desire to de-select the paragraph mark.

3. The computer-readable storage medium of claim 2, wherein causing the computer to determine whether the selection action indicates a desire to de-select the paragraph mark comprises causing the computer to determine whether a selection cursor has been moved in a leftward direction.

4. The computer-readable storage medium of claim 2, further comprising computer-executable instructions stored thereon which, when executed by a computer, cause the computer to:

determine whether the paste point is within a paragraph in the target document; and eliminate the paragraph mark from the selected document element in response to a determination that the paste point is within the paragraph in the target document.

5. The computer-readable storage medium of claim 1, wherein the selection of the document element includes an instruction to copy the document element.

6. The computer-readable storage medium of claim 1, wherein the selection of the document element includes an instruction to cut the document element.

7. A computer-implemented method for eliminating a paragraph mark from a document element selected from a source document, the method comprising:

determining the selection of the document element in the source document, the document element having an associated formatting style;

determining a paste point in a target document having a corresponding formatting style, wherein having the corresponding formatting style comprises having a same style name;

determining whether only one paragraph mark is included in the document element;

determining whether the paste point in the target document is not at the beginning of a paragraph in the target document and not at the end of the paragraph in the target document;

eliminating the paragraph mark from the document element in response to a determination that the paste point in the target document is not at the beginning of the paragraph in the target document and not at the end of the paragraph in the target document and that only one paragraph mark is included in the document element wherein a user's desire to paste the document element as part of the paragraph in the target document is indicated by only one paragraph mark included in the document element, the paste point in the target document not at the beginning of the paragraph in the target document, and the paste point in the target document not being at the end of the paragraph in the target document;

determining whether the corresponding formatting style belongs to a formatting style group;

determining whether a member formatting style in the formatting style group has been used in the target document;

pasting the document element as an independent paragraph if the entire first paragraph has been selected and no selection action has been made that indicates a desire to de-select the paragraph mark; and applying the associated formatting style to the pasted document element, wherein applying the associated style to the pasted document element comprises resolving a style conflict between the source document and the target document.

8. The computer-implemented method of claim 7, further comprising pasting the selected document element at the paste point in the target document as a part of the paragraph in the target document.

9. The computer-implemented method of claim 7, further comprising:

determining whether an entire paragraph is represented by the selected document element;

in response to determining that the selected document element represents an entire paragraph, that the paragraph mark is not included in the selected document element, and that the paste point is not within the paragraph in the target document, adding the paragraph mark to the selected document element; and pasting the document element as an independent paragraph at the paste point in the target document.

10. The computer-implemented method of claim 7, further comprising:

determining whether the document element is a list item;

determining whether the paste point is within a list in the target document; and eliminating the paragraph mark from the document element, in response to a determination that the paste point is within the list in the target document, that the paragraph mark is included in the document element, and that the document element is not a list item.

11. A computer-implemented method for eliminating empty paragraphs from a document, the method comprising:

determining the selection of a document element in a source document, the document element having an associated formatting style;

determining a first number of preceding empty paragraphs adjacent to the document element;

determining a first number of following empty paragraphs adjacent to the document element;

determining a total of the first number of preceding empty paragraphs and the first number of following empty paragraphs; and eliminating the following empty paragraphs from the source document in response to a determination that the total is less than a predetermined threshold value comprising a user defined estimate corresponding to the number of empty paragraphs present in the document that indicates that the user intends to remove the user defined estimate of empty paragraphs from the document by virtue of a cutting action;

determining a paste point in a target document having a corresponding formatting style, wherein having the corresponding formatting style comprises having a same style name;

determining whether the corresponding formatting style belongs to a formatting style group;

determining whether a member formatting style in the formatting style group has been applied, wherein determining whether the member formatting style in the formatting style group has been applied comprises determining whether the member formatting style in the formatting style group has been used in the target document;

pasting the document element as an independent paragraph if the entire first paragraph has been selected and no selection action has been made that indicates a desire to de-select the paragraph mark;

applying the associated style to the pasted document element, wherein applying the associated style to the pasted document element comprises resolving a style conflict between the document element and the target document; and redefining the associated formatting style, in response to the determination that the member formatting style in the formatting style group has been applied in the target document and that the corresponding formatting style and the associated formatting style are not identical.

12. The computer-implemented method of claim 11, further comprising:
determining if the paste point is in a non-empty paragraph;
if the paste point is not in a non-empty paragraph, determining if the paste point is at the beginning or end of the target document; and
if the paste point is not in a non-empty paragraph and if the paste point is not at the beginning or end of the target document, pasting the document at the paste point in the target document.

13. The computer-implemented method of claim 12, further comprising:
determining a second number of preceding empty paragraphs adjacent to the paste point;
determining a second number of following empty paragraphs adjacent to the paste point;
determining a total of the second number of preceding empty paragraphs and the second number of following empty paragraphs; and
if the paste point is at the beginning or end of the target document, pasting the document element at paste point in the target document with the number of empty paragraphs between each pasted non-empty paragraph equal to the total of the second number of preceding empty paragraphs and the second number of following empty paragraphs.

14. The computer-implemented method of claim 12, further comprising:
if the paste point is in a non-empty paragraph, determining if the document element comprises only one paragraph; and
if the document element comprises only one paragraph, pasting the document element at the paste point in the target document.

15. The computer-implemented method of claim 14, further comprising:
determining a second number of preceding empty paragraphs adjacent to the paste point;
if the document element comprises more than one paragraph, pasting the document element at the paste point in the target document with the number of empty paragraphs between each pasted non-empty paragraph equal to the second number of preceding empty paragraphs.

16. The computer-implemented method of claim 15, further comprising:
determining if the paste point is in a list within the target document;
if the paste point is not in a list, determining if the document element is a list; and
if the document element is a list, pasting the document at the paste point in the target document.

17. The computer-implemented method of claim 11, further comprising:
determining if the paste point is in a list within the target document;
if the paste point is not in a list, determining if the document element is a list; and
if the document element is a list, pasting the document at the paste point in the target document.

18. The computer-implemented method of claim 17, further comprising:
determining a second number of preceding empty paragraphs adjacent to the paste point;
determining a second number of following empty paragraphs adjacent to the paste point;
determining a total of the second number of preceding empty paragraphs and the second number of following empty paragraphs; and
if the paste point is not in a list and the document element is not a list, pasting the document element at paste point in the target document with the number of empty paragraphs between each pasted non-empty paragraph equal to the total of the second number of preceding empty paragraphs and the second number of following empty paragraphs.

19. The computer-implemented method of claim 17, further comprising:
if the paste point is in a list, pasting the document element at the paste point in the target document with no paragraphs between each pasted non-empty paragraph.

* * * * *